Figure 34:
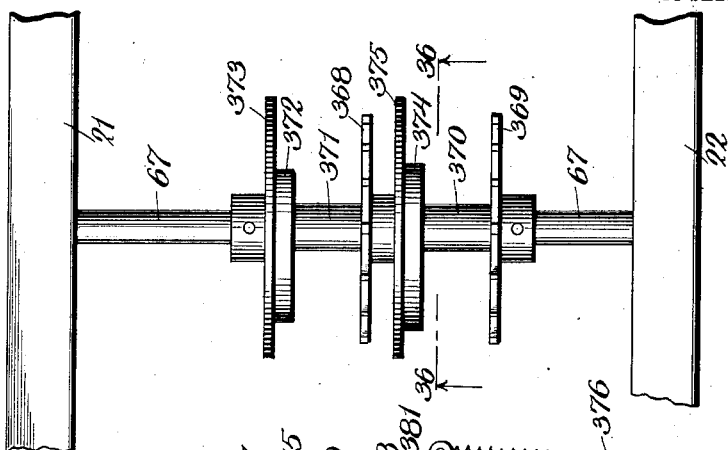

J. W. BRYCE.
TIME RECORDER.
APPLICATION FILED MAY 11, 1909.
1,075,544.
Patented Oct. 14, 1913.
24 SHEETS—SHEET 1.
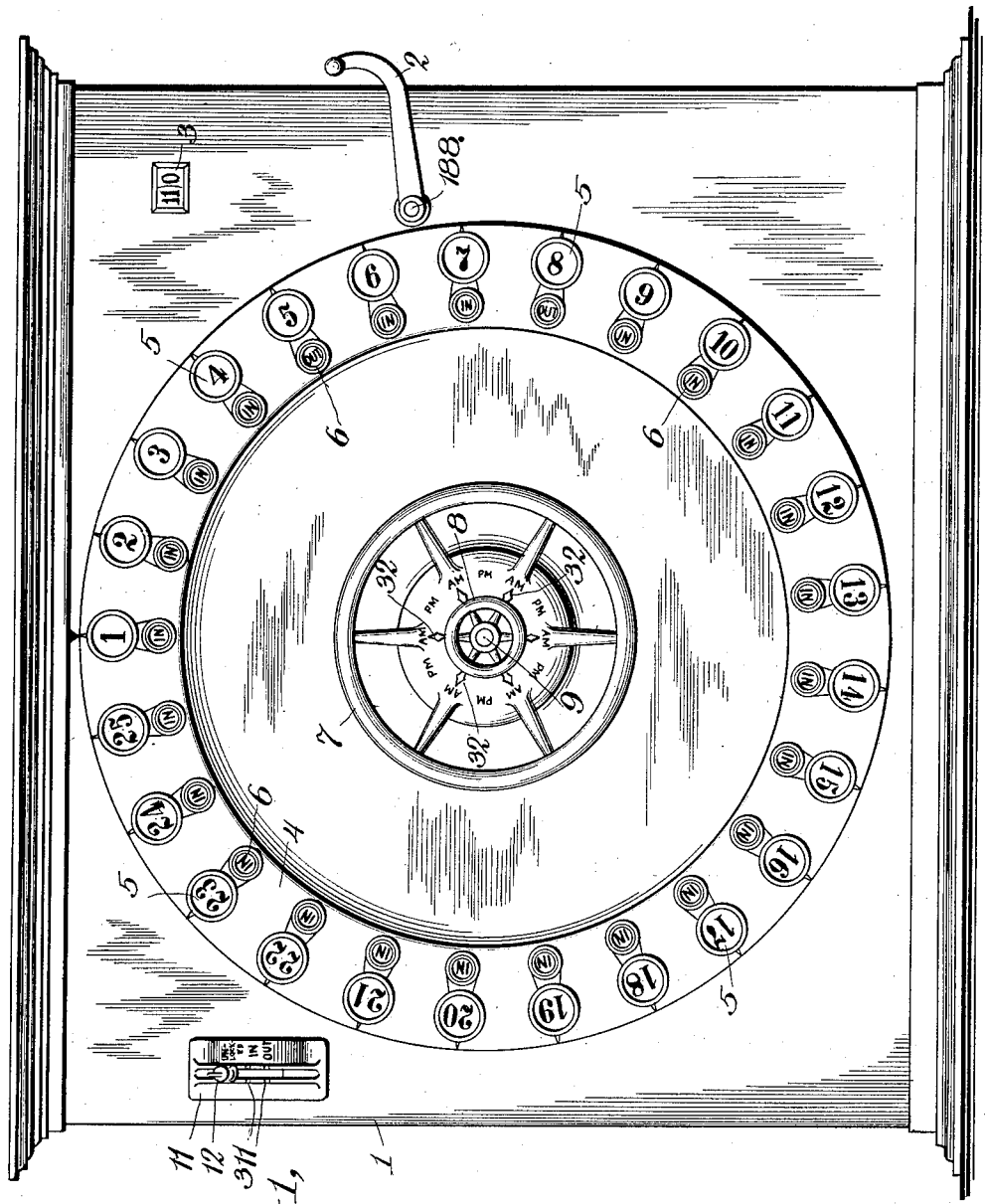
WITNESSES:
W. A. Hutton
John O. Gumpler
INVENTOR
James W. Bryce
BY
Kenyon & Kenyon
ATTORNEYS J. W. BRYCE.
TIME RECORDER.
APPLICATION FILED MAY 11, 1909.
1,075,544.
Patented Oct. 14, 1913.
24 SHEETS—SHEET 2.
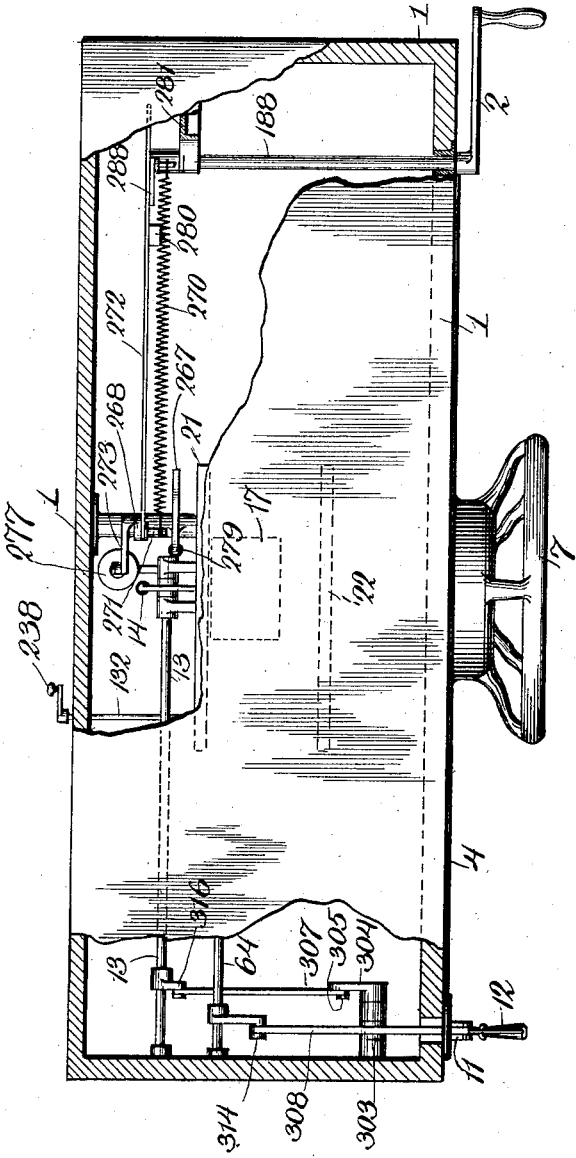
WITNESSES:
W. A. Hutton
John O. Gumpler
INVENTOR
James W. Bryce
BY
Kenyon & Kenyon
ATTORNEYS

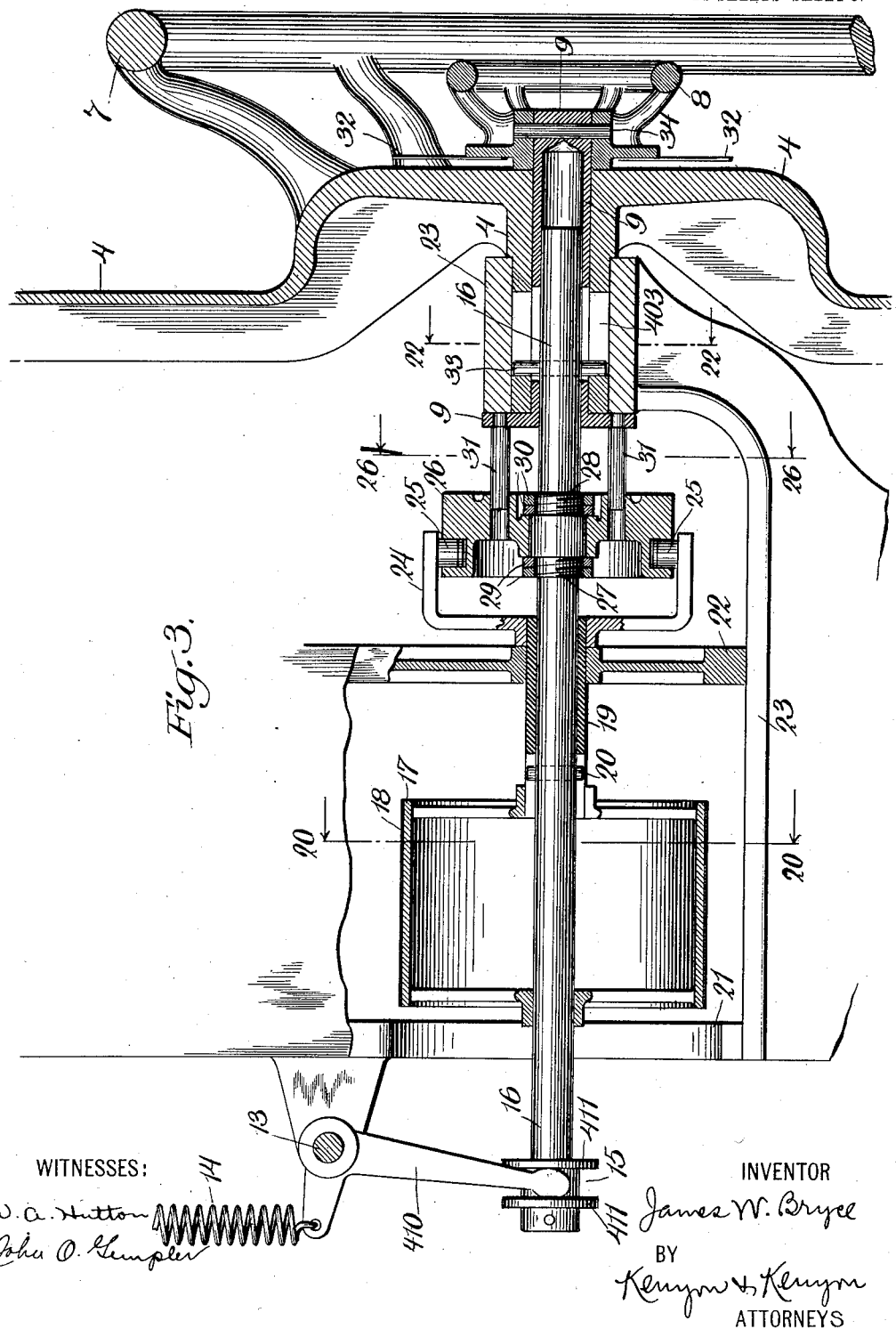

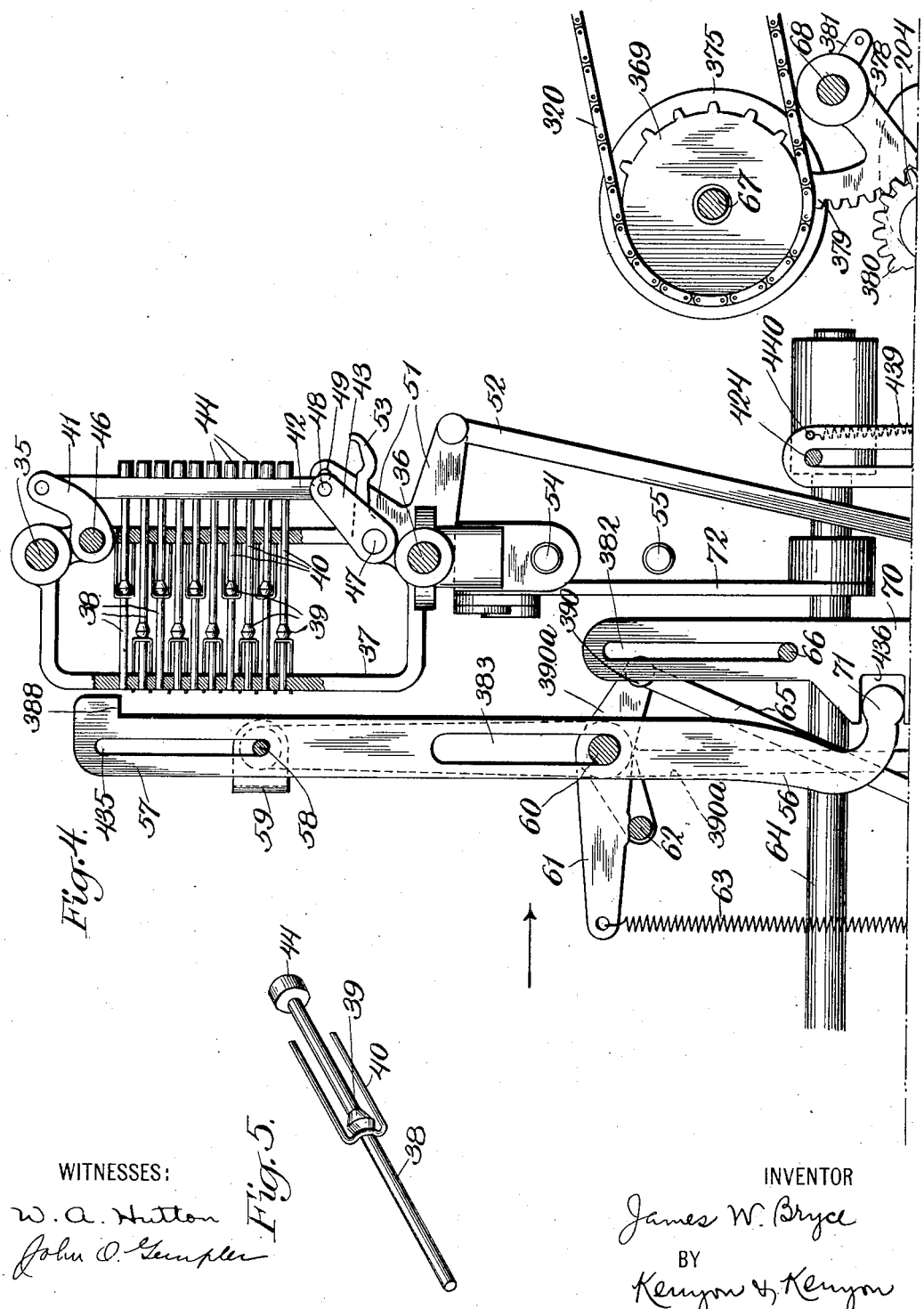

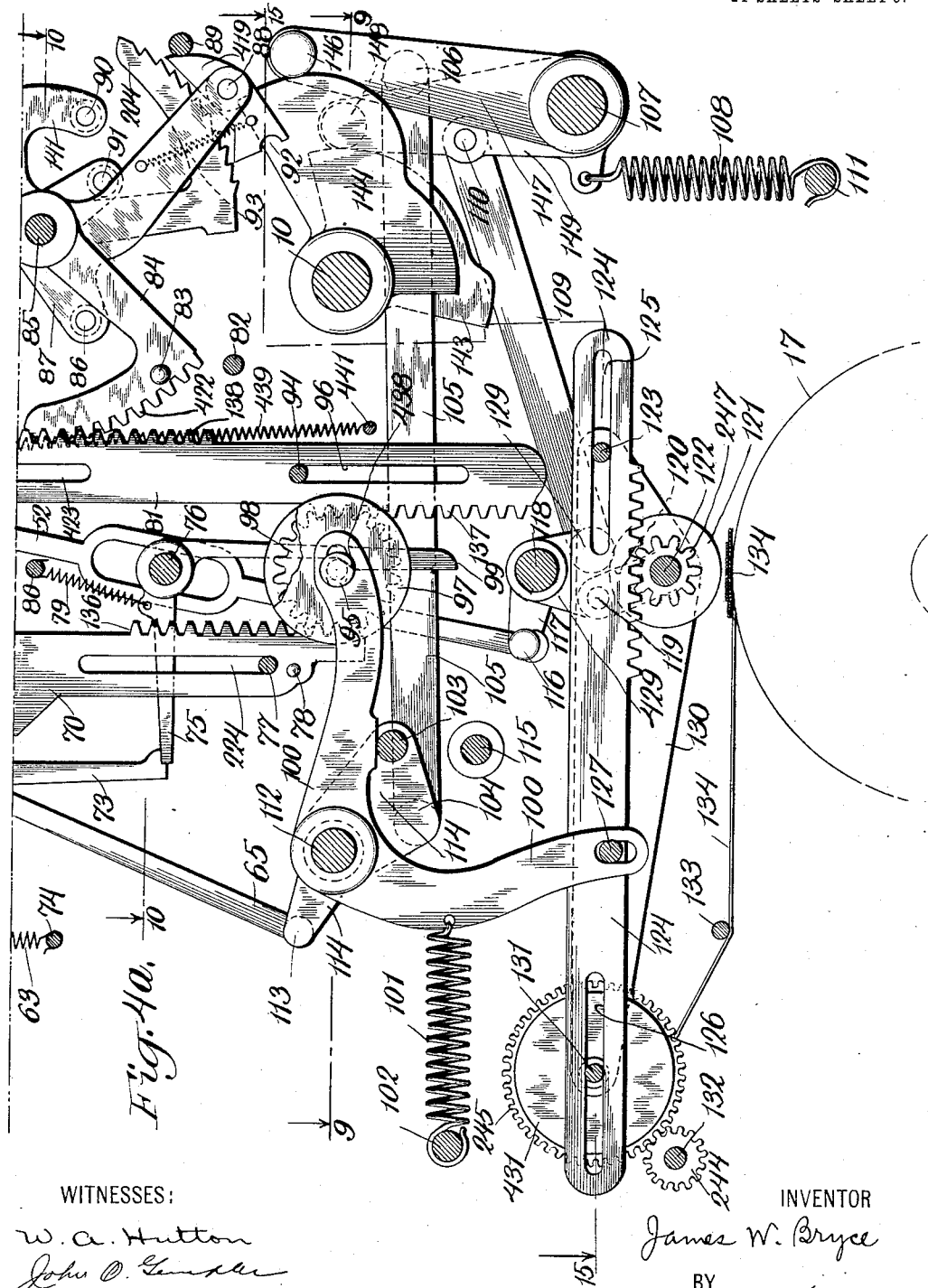

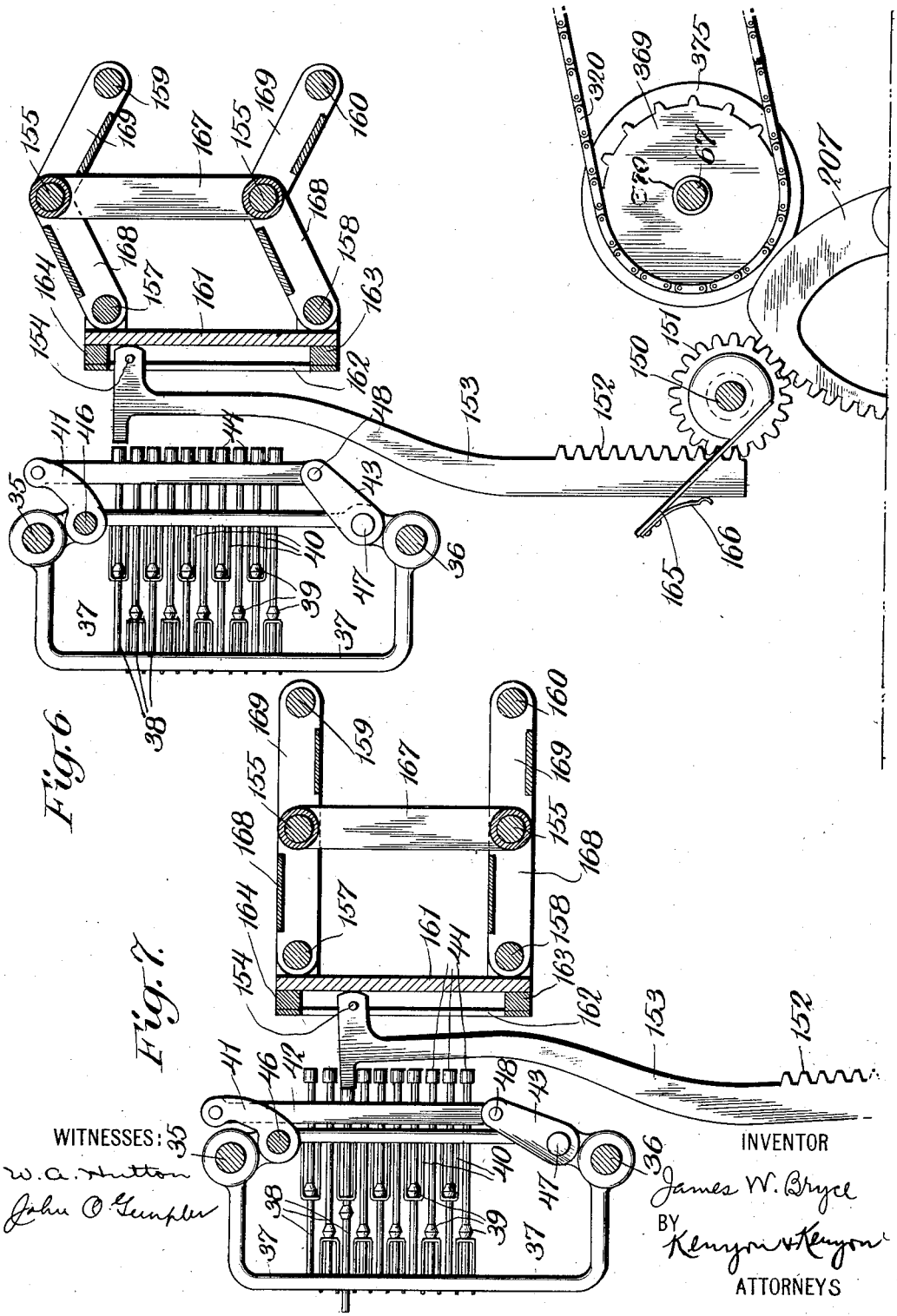

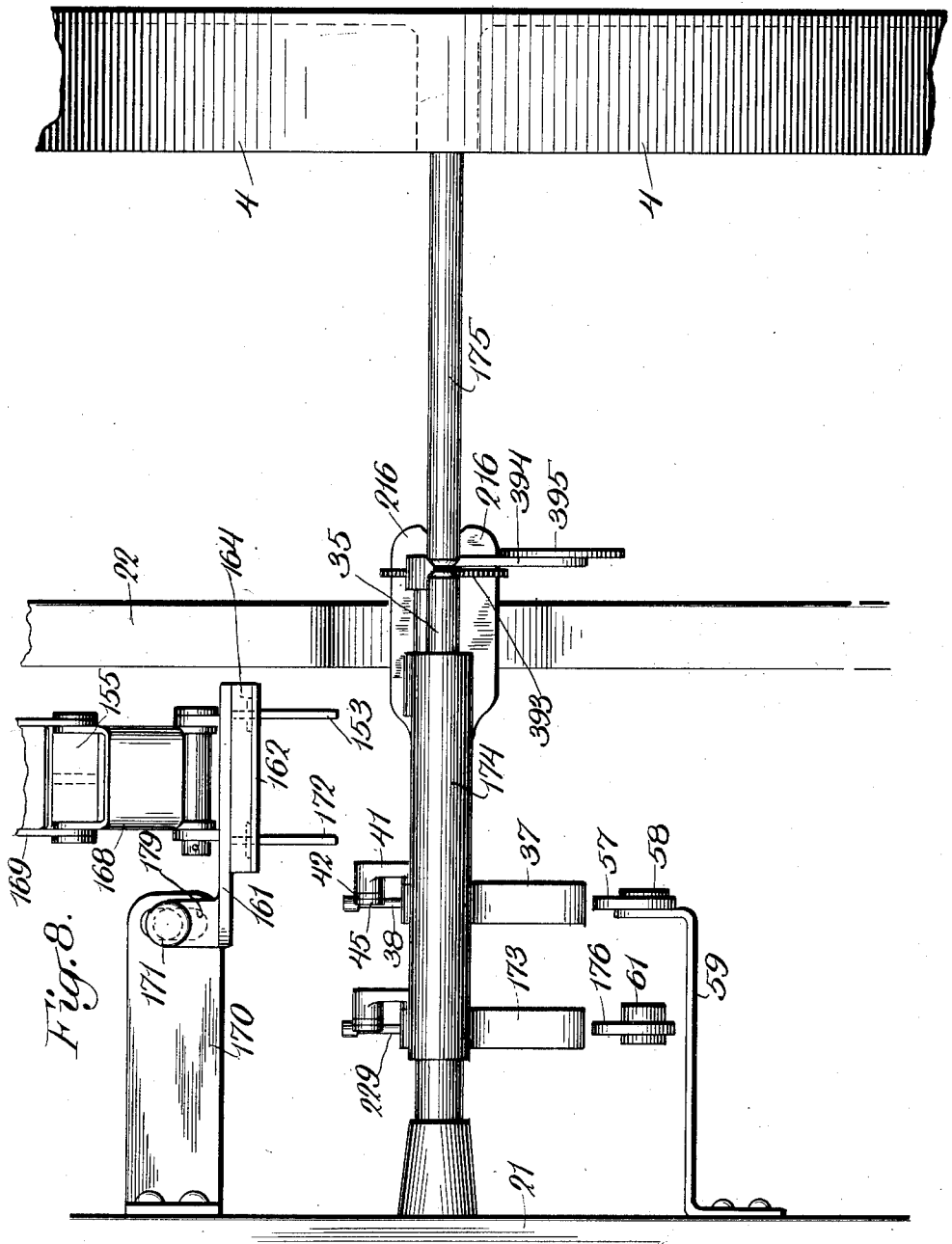

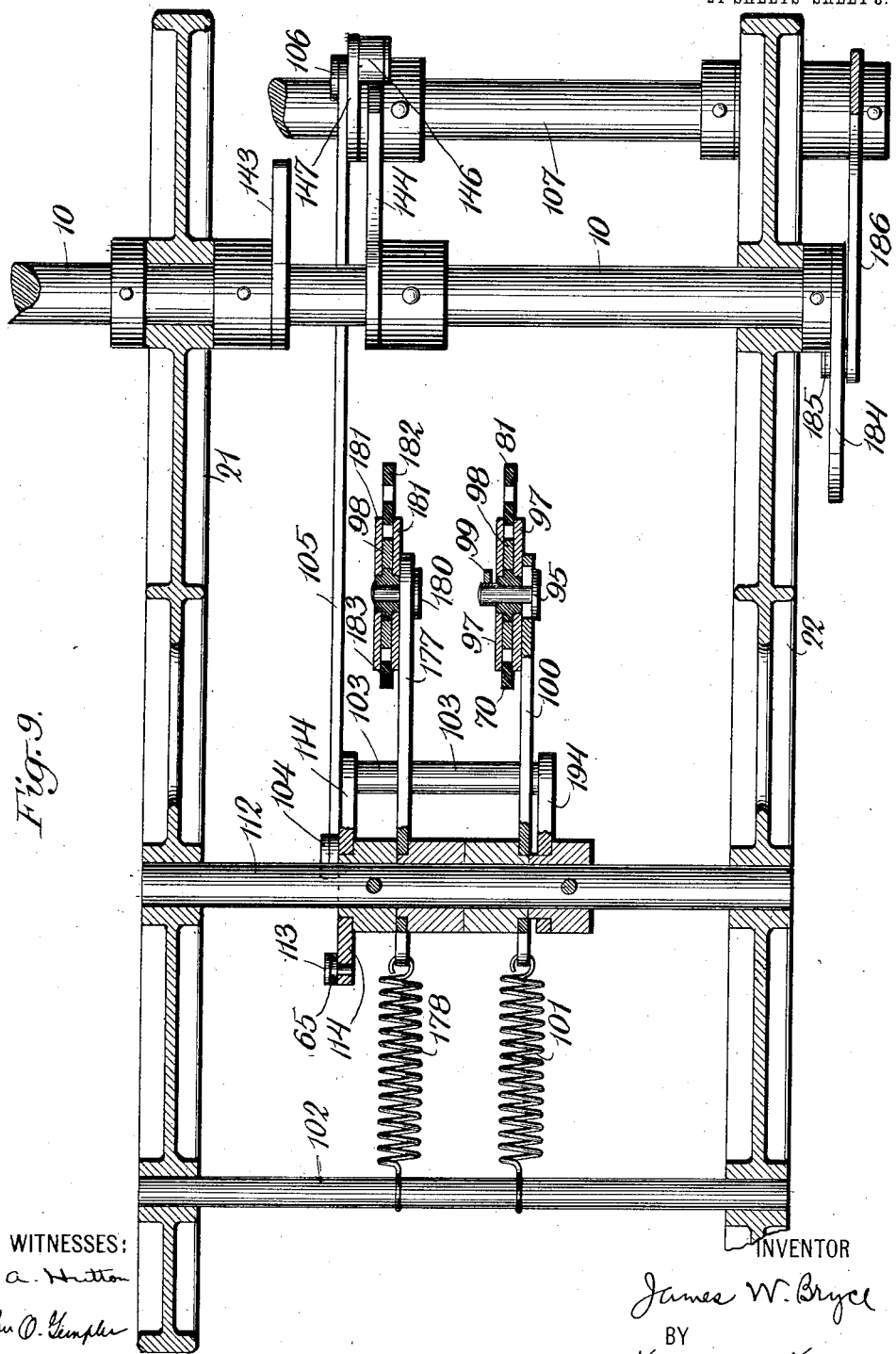

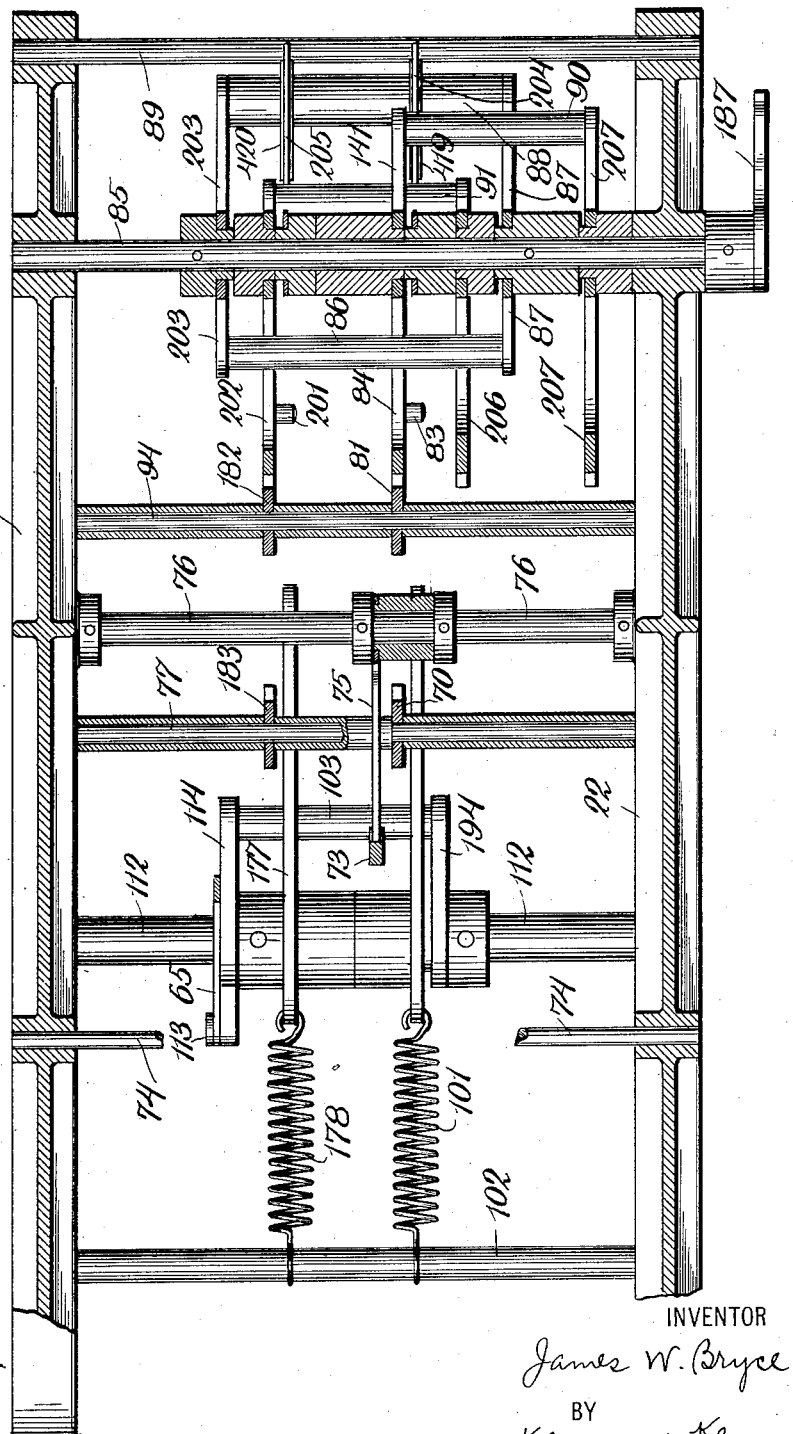

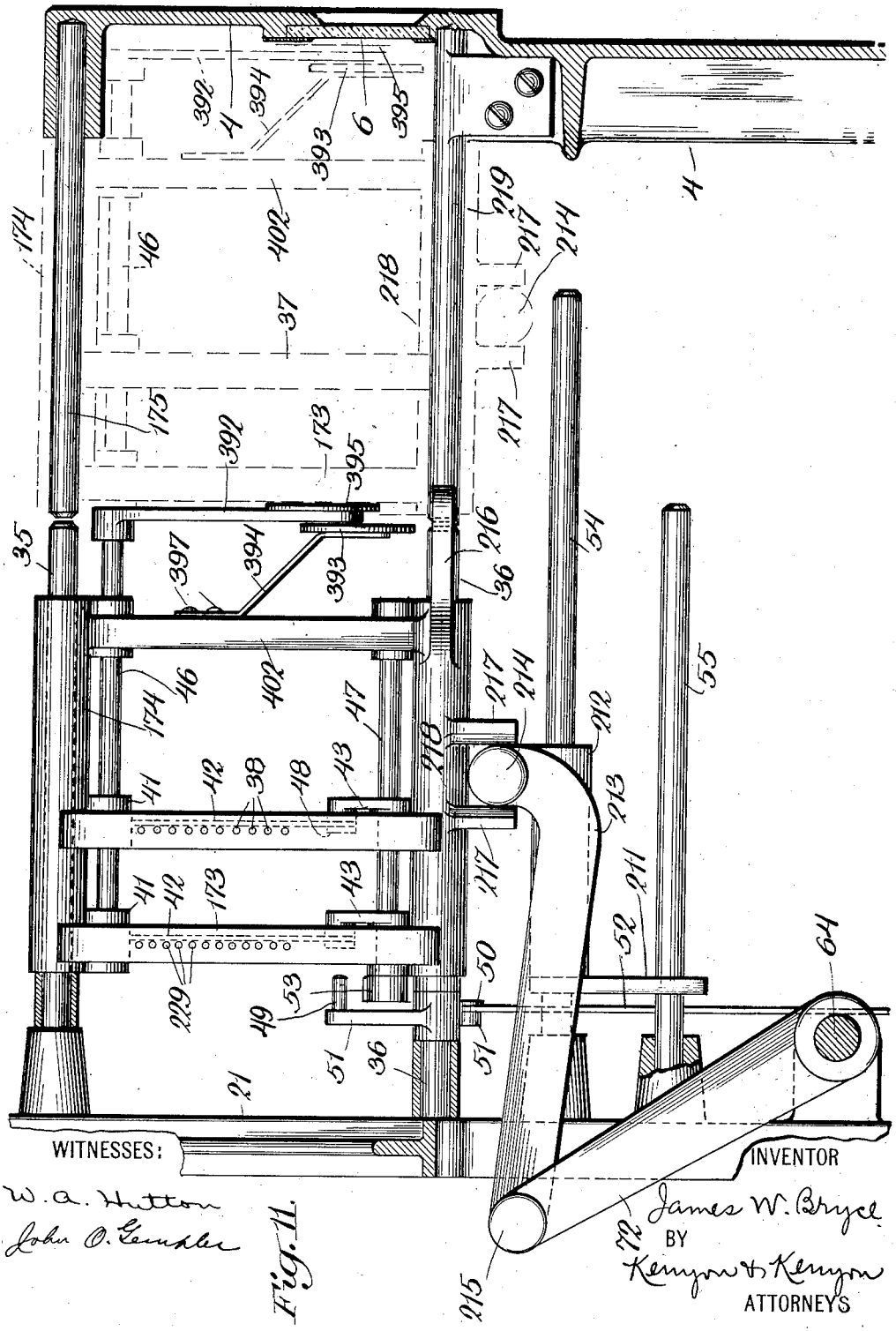

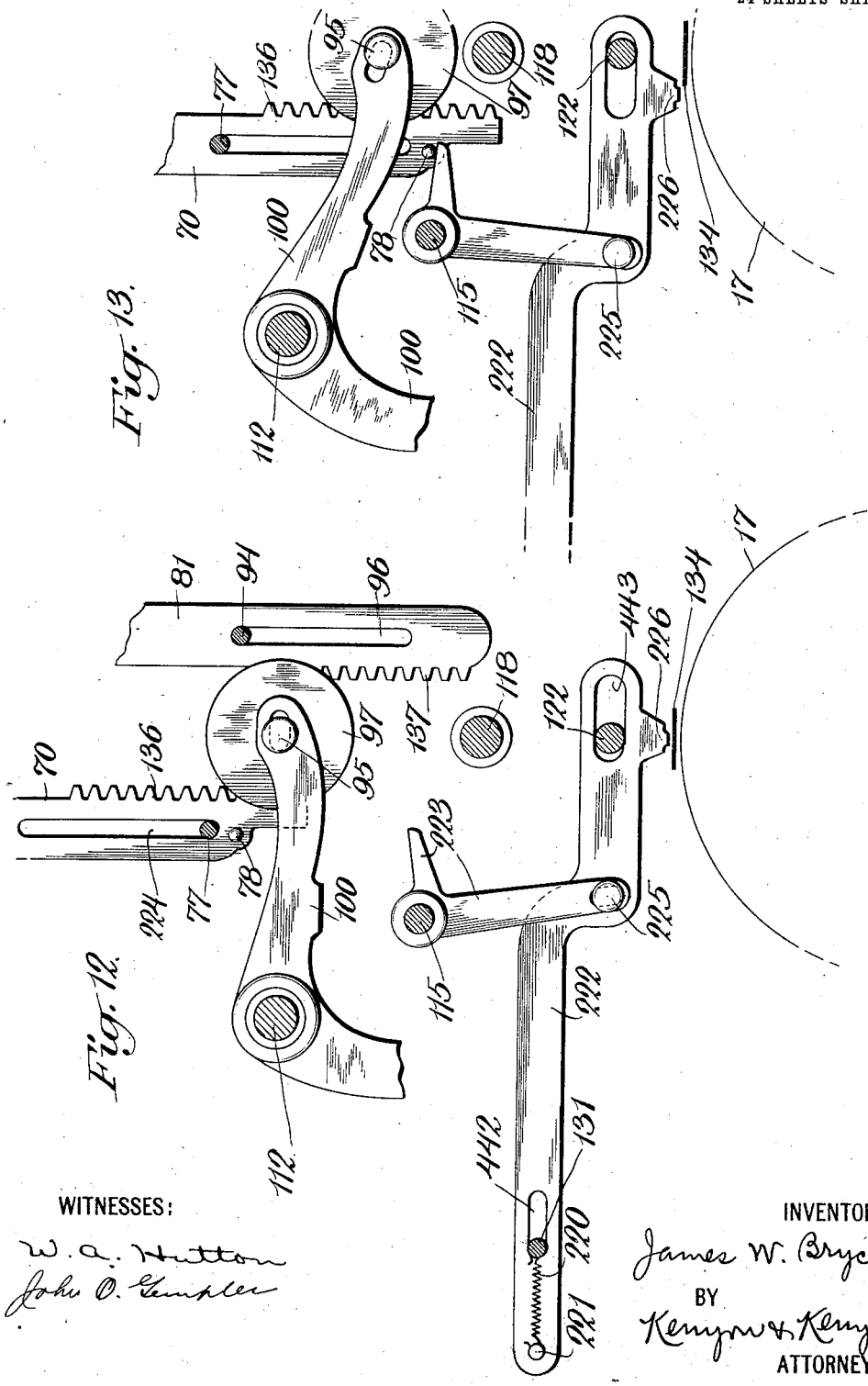

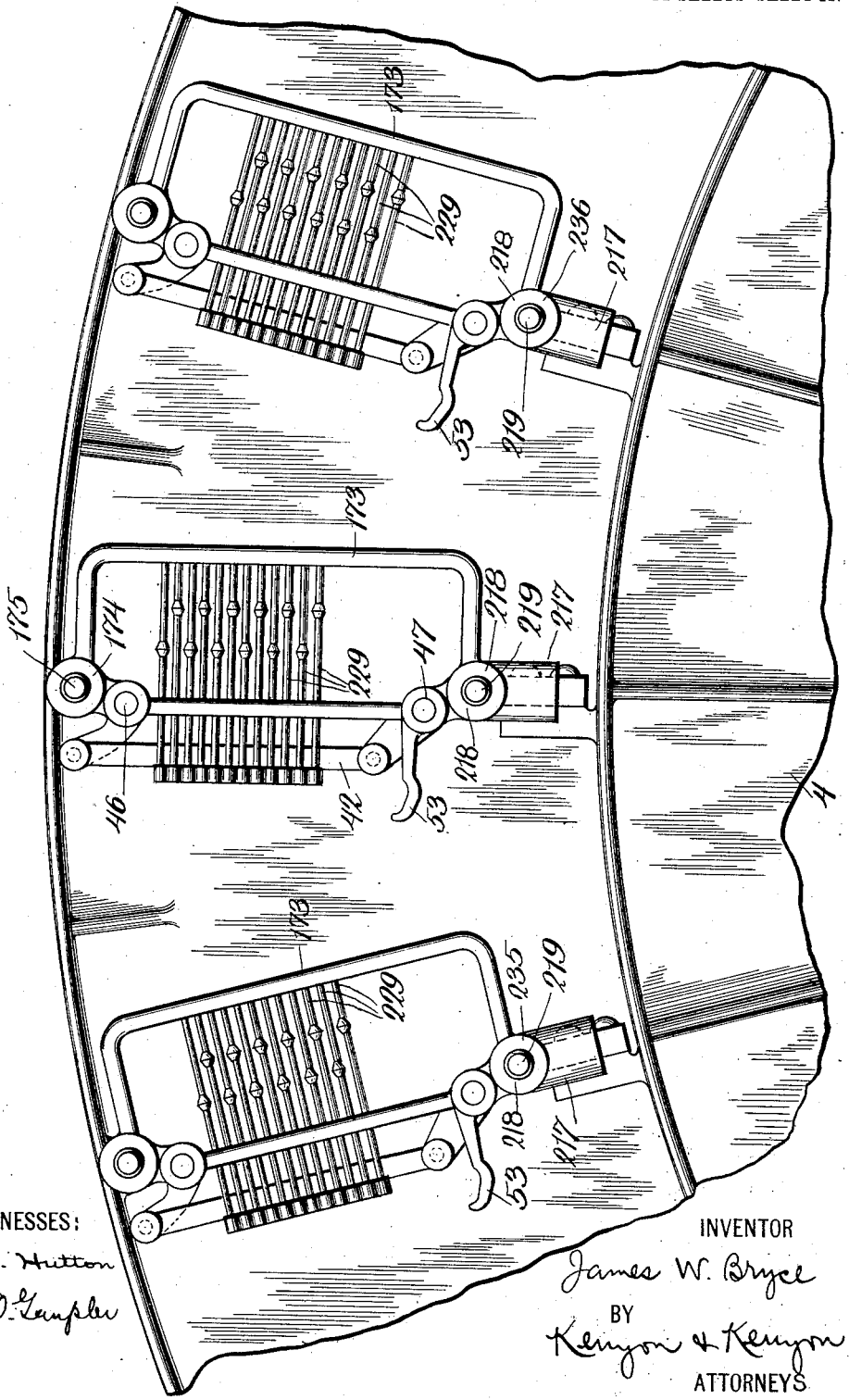

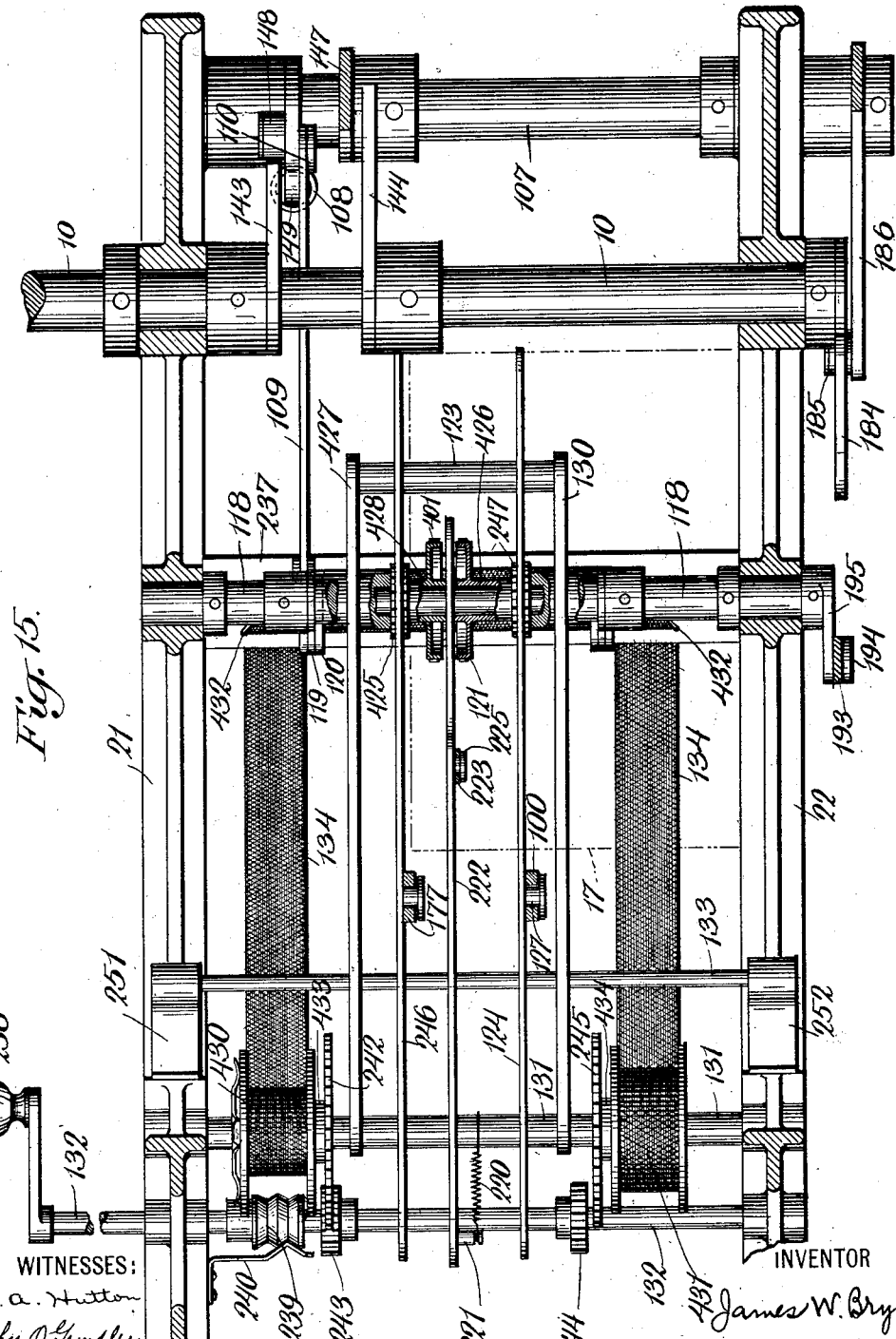

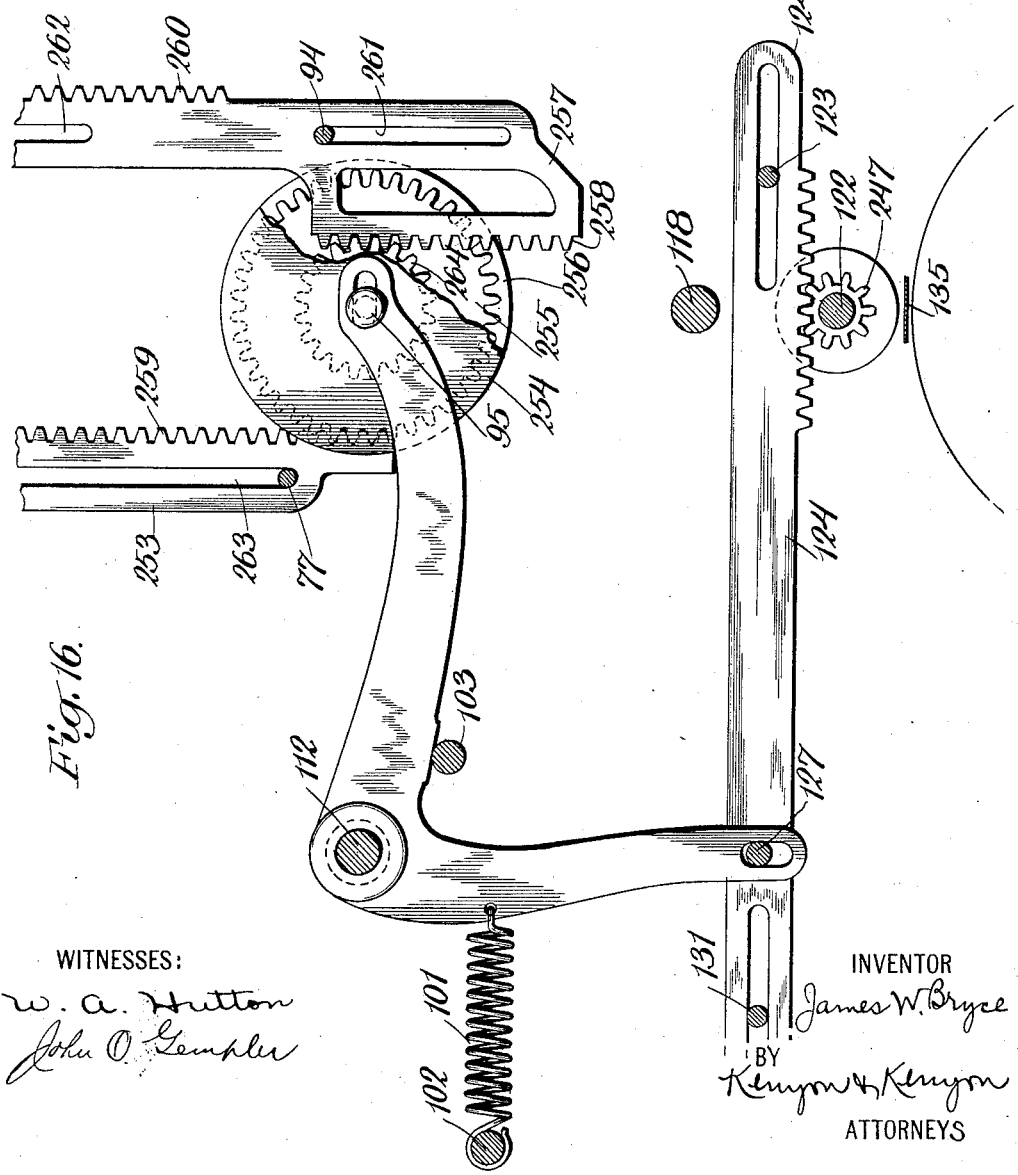

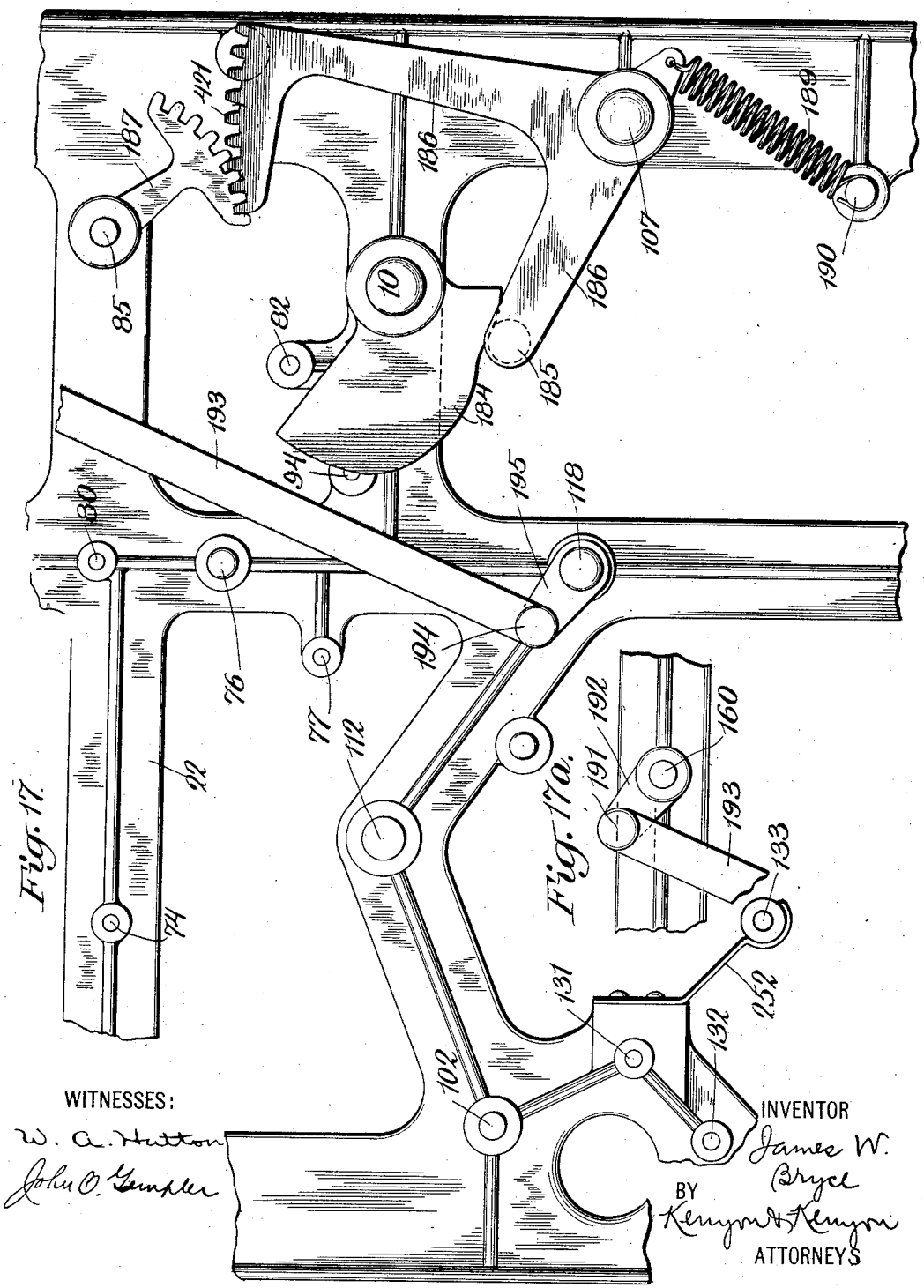

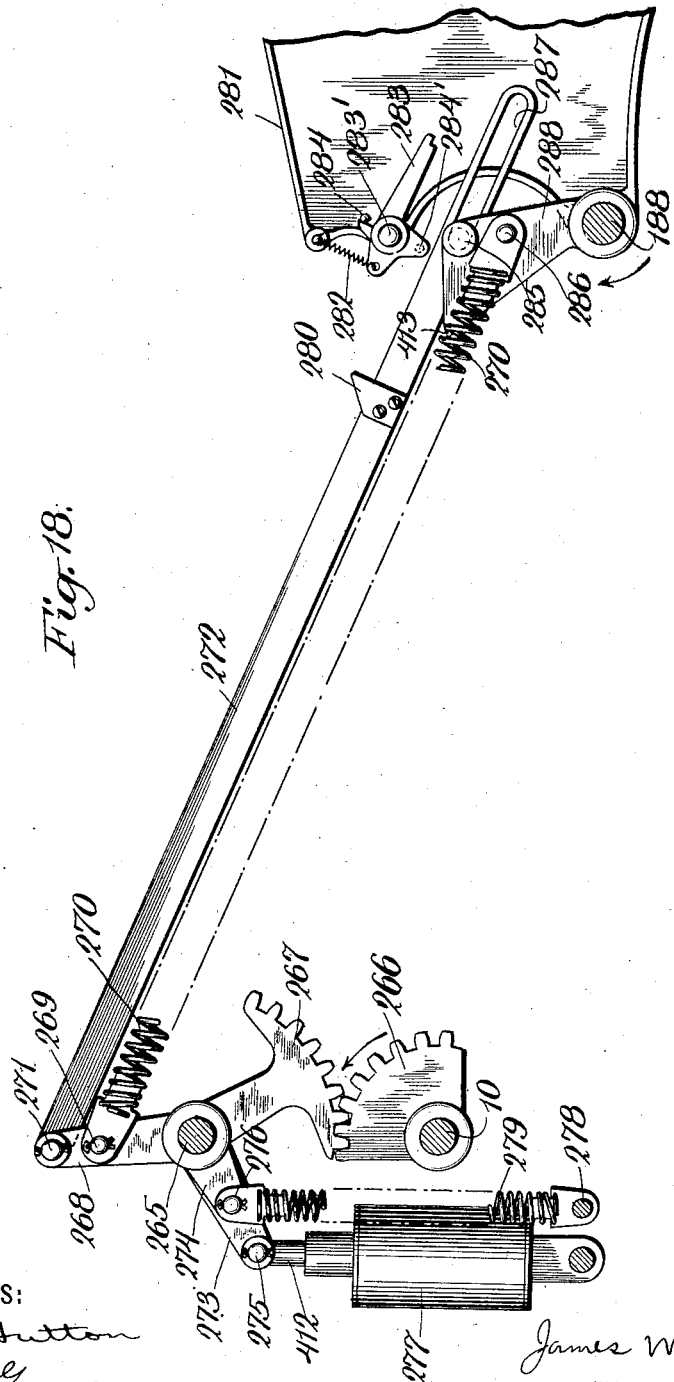

J. W. BRYCE.
TIME RECORDER.
APPLICATION FILED MAY 11, 1909.
1,075,544.
Patented Oct. 14, 1913.
24 SHEETS—SHEET 17.
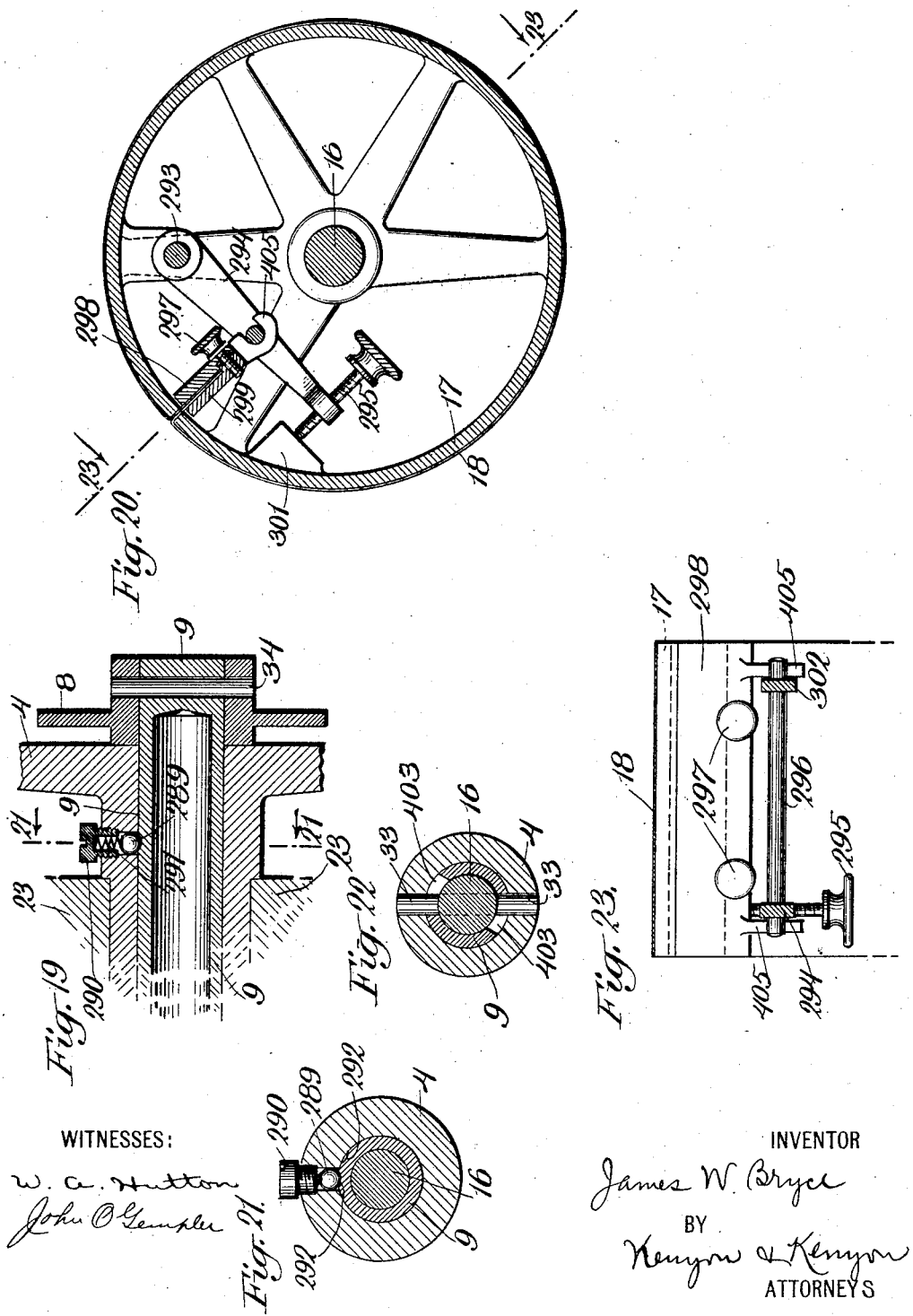
WITNESSES:
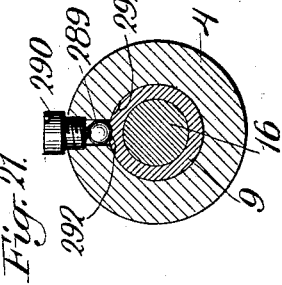
INVENTOR
James W. Bryce
BY
Kenyon & Kenyon
ATTORNEYS

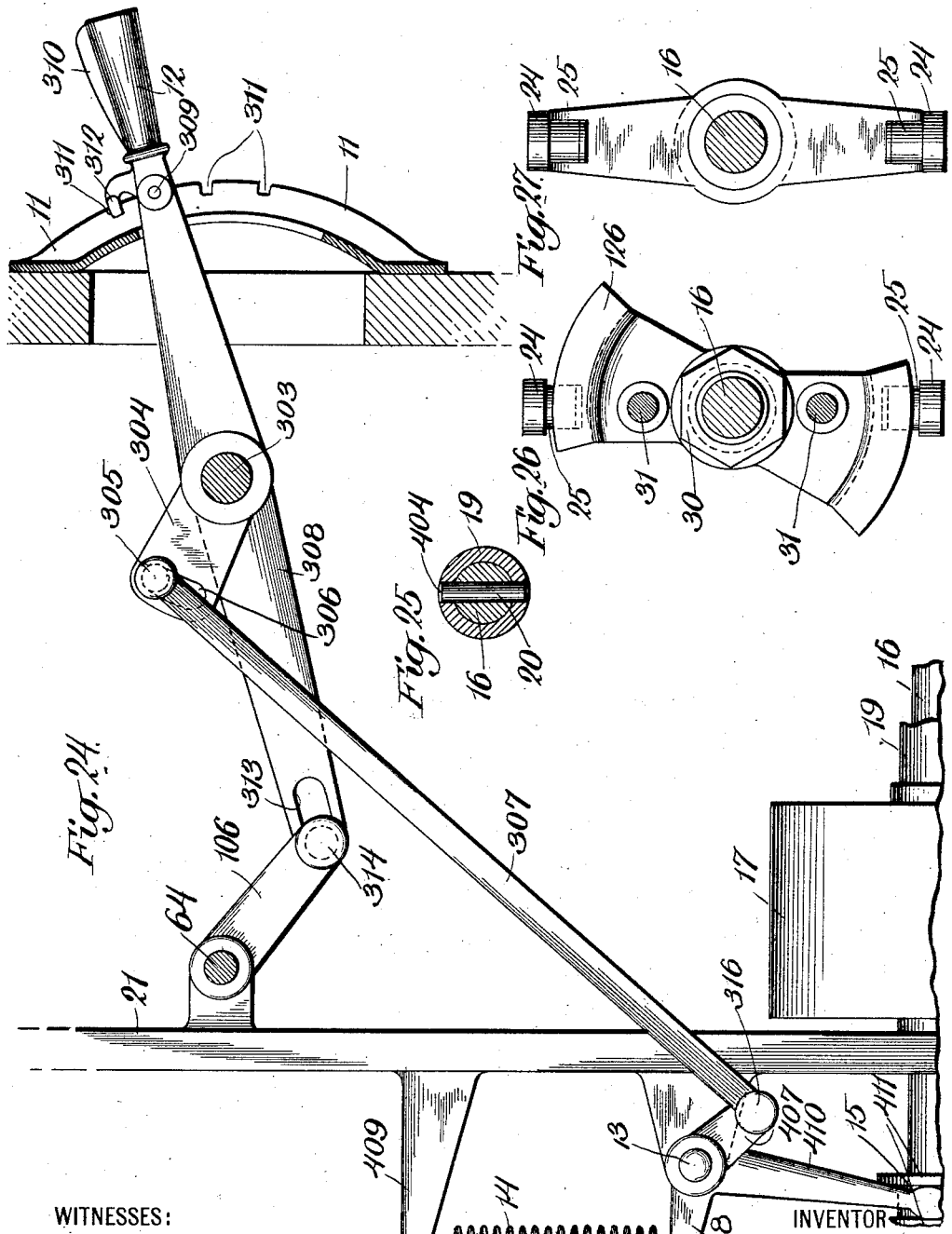

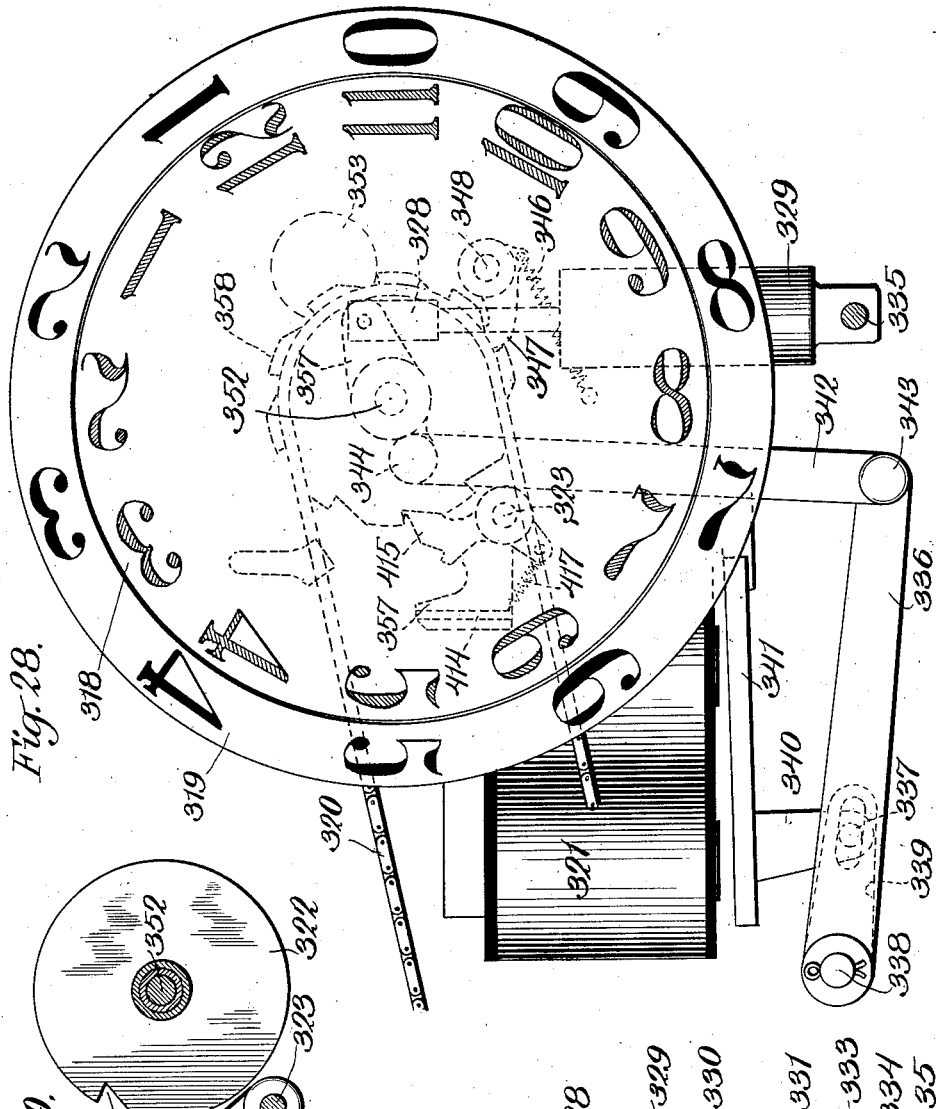

J. W. BRYCE.
TIME RECORDER.
APPLICATION FILED MAY 11, 1909.
1,075,544.
Patented Oct. 14, 1913.
24 SHEETS—SHEET 20.
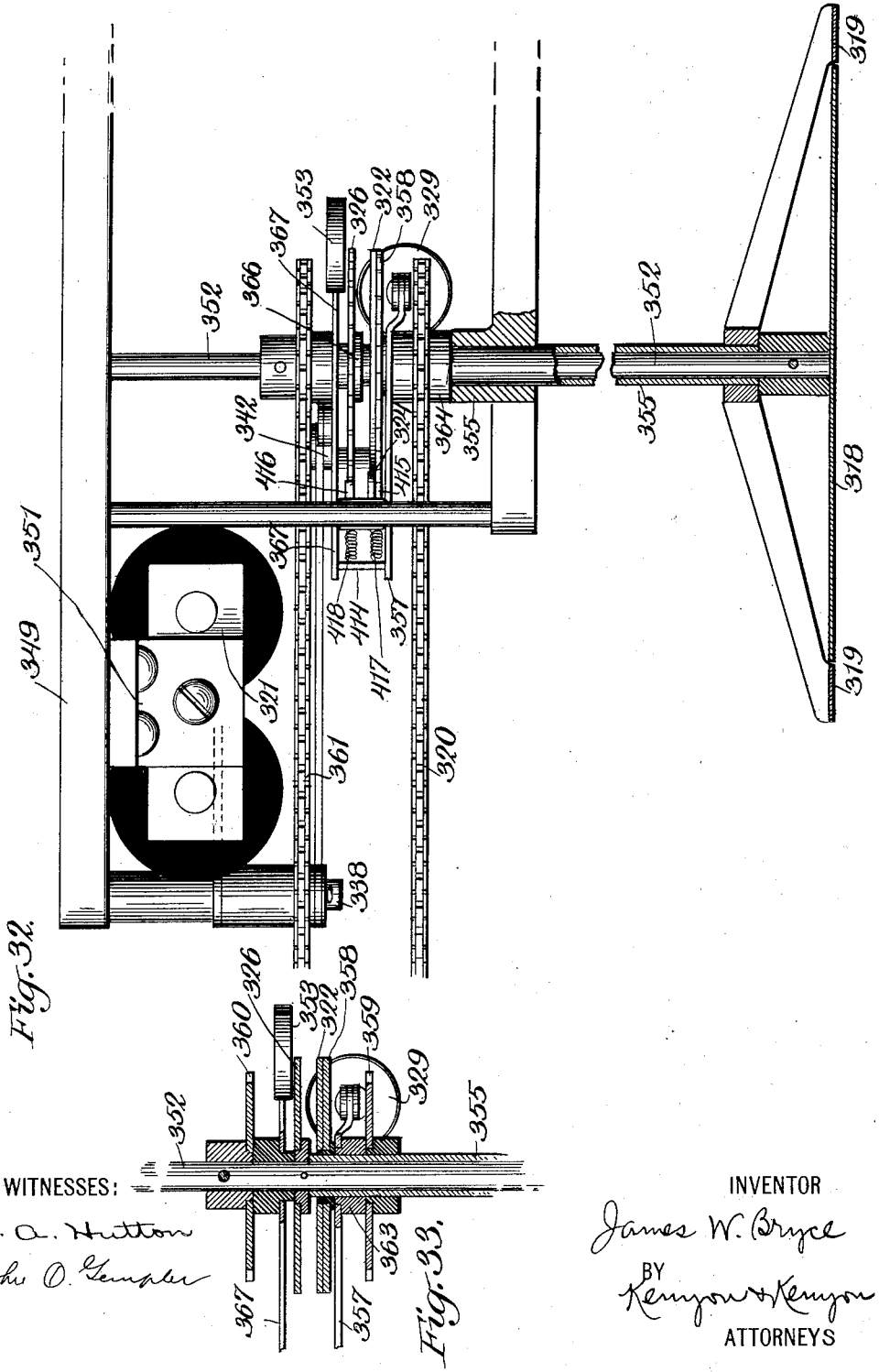
WITNESSES:
INVENTOR
James W. Bryce
BY
Kenyon & Kenyon
ATTORNEYS

J. W. BRYCE.
TIME RECORDER.
APPLICATION FILED MAY 11, 1909.

1,075,544.

Patented Oct. 14, 1913.

24 SHEETS—SHEET 21.

WITNESSES:
W. A. Hutton
John O. Gemsler

INVENTOR
James W. Bryce
BY
Kenyon & Kenyon
ATTORNEYS

COLUMBIA PLANOGRAPH CO., WASHINGTON, D. C.

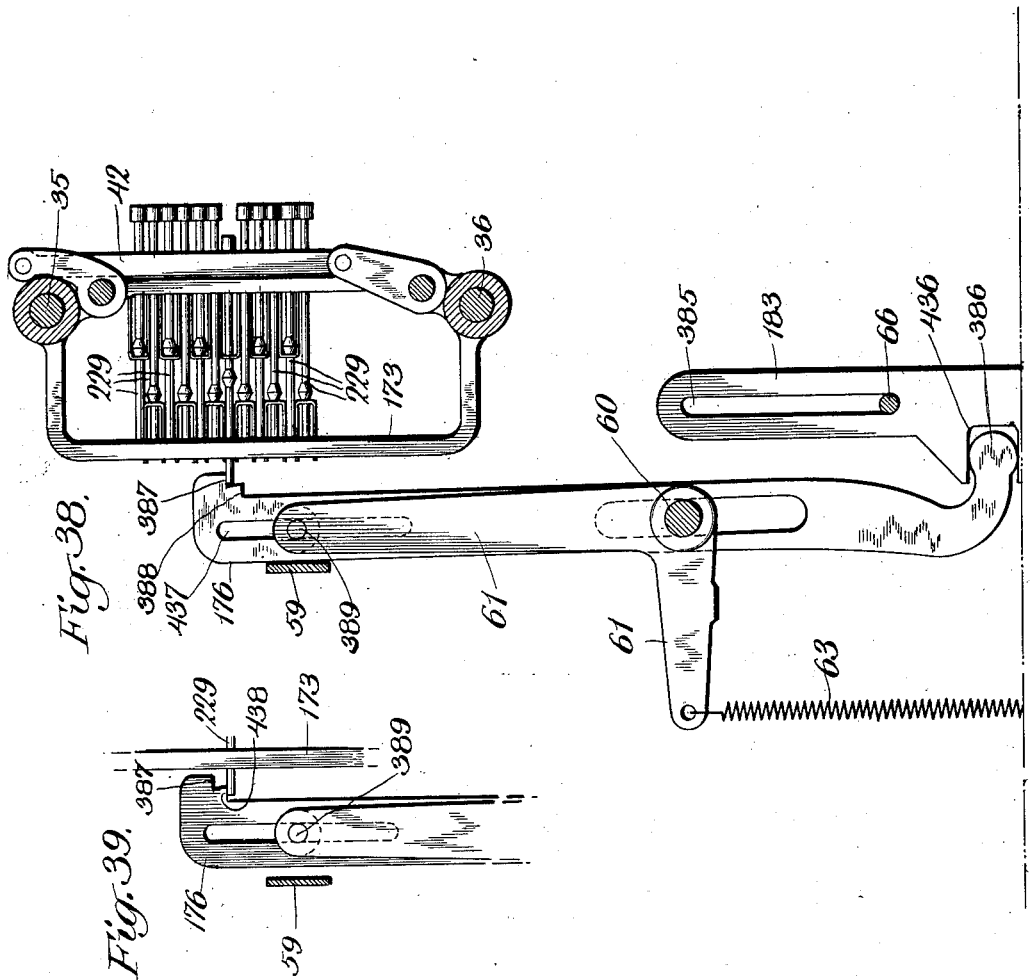

J. W. BRYCE.
TIME RECORDER.
APPLICATION FILED MAY 11, 1909.
1,075,544.
Patented Oct. 14, 1913.
24 SHEETS—SHEET 23.
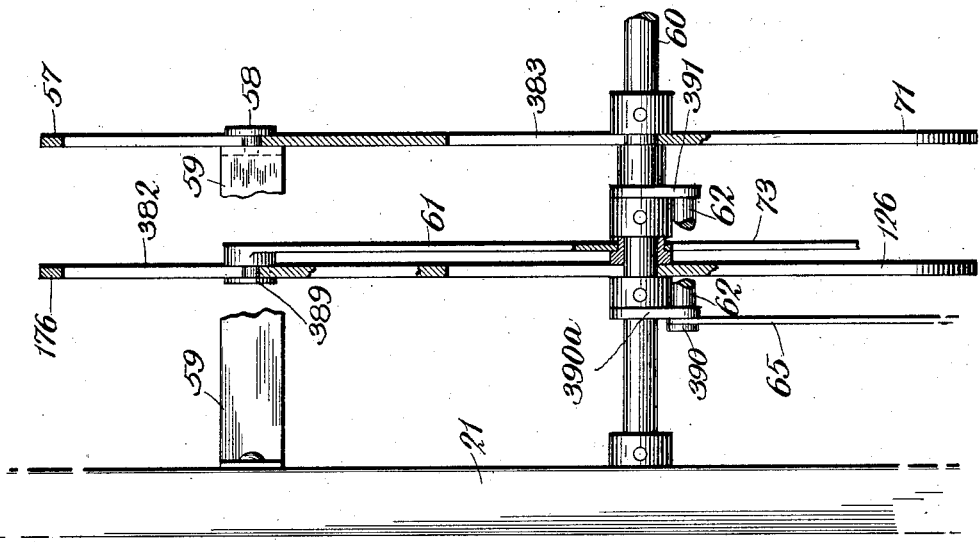
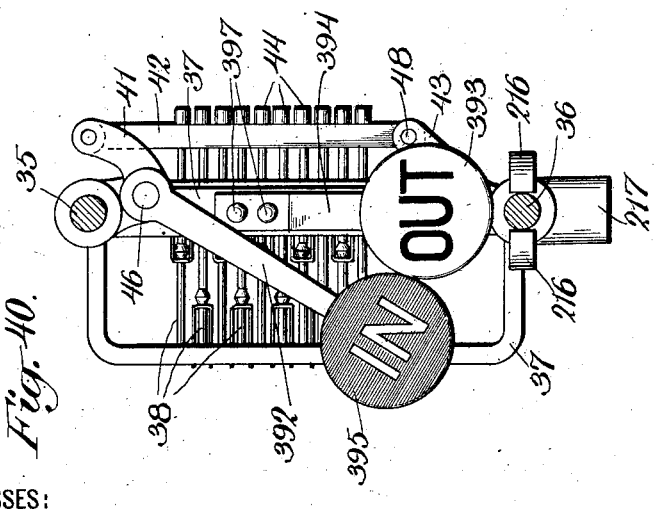
WITNESSES:
INVENTOR
James W. Bryce
BY
Kenyon & Kenyon
ATTORNEYS J. W. BRYCE.
TIME RECORDER.
APPLICATION FILED MAY 11, 1909.
1,075,544.
Patented Oct. 14, 1913.
24 SHEETS—SHEET 24.
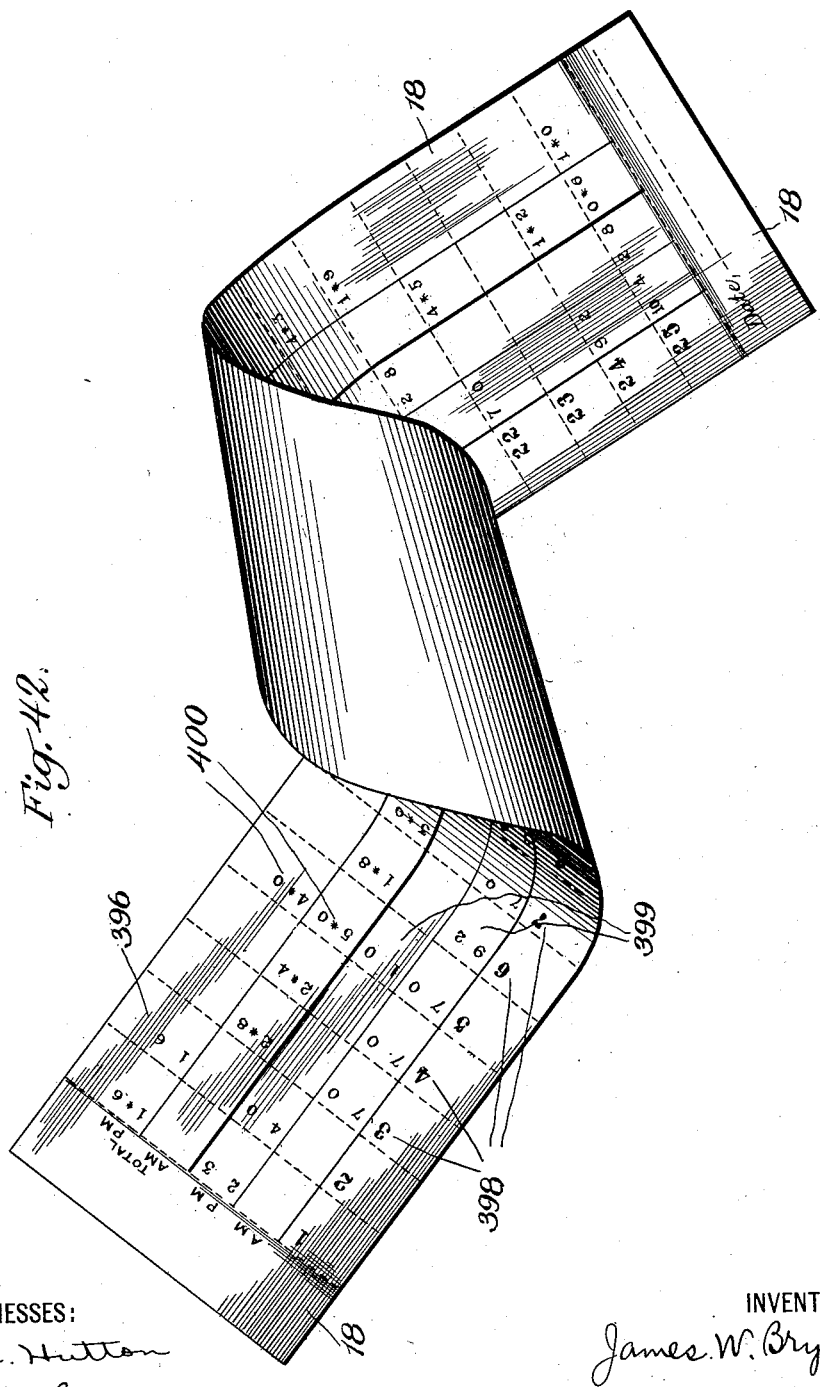
WITNESSES:
W. A. Hutton
John O. Gumplee
INVENTOR
James W. Bryce
BY
Kenyon & Kenyon
ATTORNEYS

UNITED STATES PATENT OFFICE.

JAMES W. BRYCE, OF BROOKLYN, NEW YORK.

TIME-RECORDER.

1,075,544.   Specification of Letters Patent.   Patented Oct. 14, 1913.

Application filed May 11, 1909. Serial No. 495,207.

*To all whom it may concern:*

Be it known that I, JAMES W. BRYCE, a citizen of the United States, and a resident of Brooklyn, in the county of Kings and State of New York, have invented certain new and useful Improvements in Time-Recorders, of which the following is a specification.

My invention relates to time indicating and recording machines.

It is of especial value in machines for indicating elapsed time between two operations, although in some of its features it is not limited to use in such a machine.

It has for its object to provide a machine, upon which any one of a number of operators can, independently of other operators, set a preliminary or initial record or indication representing the time of a first or "in" operation by that operator, as for example the time a workman begins his day's work, or his work upon a particular job, and which machine the same operator can, at a later time, again operate, as for example at the close of the day's work or at the end of the job, and make a record or other indication of the elapsed time between the two operations by him of the machine, and this preferably without the necessity of the operator having or carrying any record card or other removable record device, and without the initial or elapsed time records or indications of any one operator interfering in any way with those of other operators; also in such a machine to provide means whereby such records or indications can be made by a large number of operators rapidly and successfully, irrespective of the order in which the operators come and irrespective of whether successive operations of the machine are initial or final; also to provide means to indicate the condition of the operators, whether "in" or at work or "out" or not at work; also to provide new and improved means for making a record of the various operations of such a machine by different operators; also to reduce the number of parts and generally to simplify and improve time indicating or recording machines.

The invention consists in the novel devices and combinations herein shown and described.

In the drawings accompanying this specification and forming a part hereof, I have shown my invention in its preferred form as embodied in a machine which indicates the time of the beginning of an operation and the elapsed time between two operations by the same workman by recording the same upon a record strip, provided with suitable spaces for a number of operators, although in some of its features at least my invention is not limited to use in such a machine.

Figure 35:
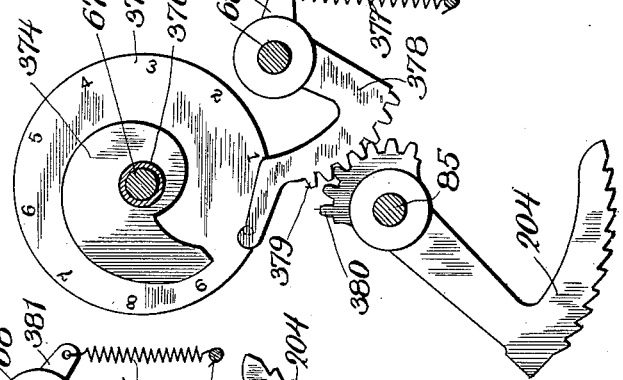
Figure 36:
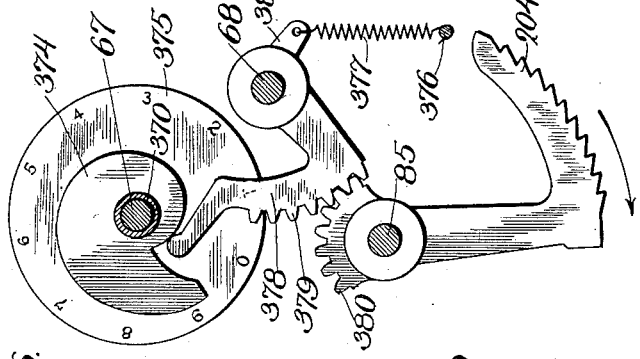
Figure 37:
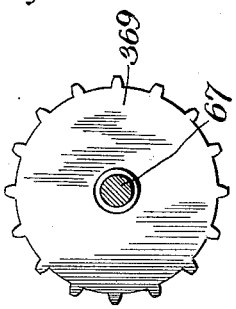

I will now proceed to describe the preferred form of my invention as disclosed in the particular machine shown in the drawings. Referring to such specific embodiment and to the drawings illustrating it, Figure 1 is a front view of such a machine. Fig. 2 is a top view partly broken away to show the impulse mechanism, etc. Fig. 3 is a central longitudinal section through the record drum and connecting parts. Figs. 4 and 4$^a$ form a central vertical cross-section through the main part of the mechanism showing one of the devices, adapted to be set in accordance with any time, the train of clock controlled mechanism co-acting with it, etc. Fig. 5 is a detail perspective view of one of the pins of the time devices showing its collars and the friction spring for retaining or locking it in place. Fig. 6 is a detailed section showing an identification device in register with its setting device for setting the "in" time. Fig. 7 is a similar detailed section showing the setting mechanism at the forward part of its stroke in the act of pushing the pin forward to set it. Fig. 8 is a top view of the mechanism shown in Figs. 6 and 7. Fig. 9 is a horizontal section taken on the line 9—9, Fig. 4$^a$. Fig. 10 is a similar section on the line 10—10, Fig. 4$^a$. Fig. 11 is a longitudinal vertical section taken at right angles to the dial and also at right angles to the mechanism, as shown in Figs 4 and 4$^a$. Figs 12 and 13 are detailed side views of the star printing mechanism and its connecting parts for printing or omitting to print a star to indicate whether any record is an elapsed time record or not. Fig. 14 is a rear view of a part of the dial carrying the identification devices. Fig. 15 is a horizontal section taken on line 15—15 of Fig. 4$^a$. Fig. 16 is a detailed side view of a compound differential to permit a wider spacing between the pins of the time devices. Fig. 17 is a rear view of the machine showing certain parts of the operating mechanism placed, for convenience, on the outside of the framework. 17$^a$ is a detail of the toggle operating mechanism. Fig. 18 is a side view of the impulse mechanism. Fig. 19 is a central longitudinal section through the hub of the dial and connecting parts showing an impositive lock used for holding together the dial and the sleeve upon which the A. M. and P. M. hand-wheel is mounted. Fig. 20 is a cross-section through the record carrying drum on line 20—20 of Fig. 3. Fig. 21 is a cross-section on line 21—21 of Fig. 19. Fig. 22 is a cross-section on line 22—22 of Fig. 3. Fig. 23 is a section on line 23—23 of Fig. 20. Fig. 24 is a longitudinal section taken just inside of the left-hand side of the case, as viewed in Fig. 1, showing in side view the "in" and "out" lever and its connecting links and levers. Fig. 25 is a detailed vertical cross-section through shaft 16 and sleeve 19 showing pin 20 and slot 404. Fig. 26 is a vertical cross-section on the line 26—26 of Fig. 3. Fig. 27 is the same as Fig. 26, with the cam omitted to show more clearly the cam rollers, etc. Fig. 28 is a front view of the indicating disks. Fig. 29 is a detailed view of a time controlled disk and Fig. 30 a detailed view of the hour ratchet; and Fig. 31 a detailed section of the dash-pot controller. Fig. 32 is a plan view of the time controlled electric drive mechanism, Fig. 33 a detailed horizontal section through the shaft of the timing mechanism. Fig. 34 is a plan view of the cams and sprocket wheels for setting the time-of-day part of the mechanism; Figs. 35 and 36 sections on line 36—36 of Fig. 34, Fig. 36 showing the mechanism in its normal position and Fig. 35 showing the wiper in its removed position occupied by it during a recording operation; and Fig. 37 a detailed side view of one of the sprockets. Fig. 38 is a detailed side view of an hour time device and Fig. 39 a detailed view like Fig. 38 except that Fig. 38 is in the subtracting position. Fig. 40 is a detailed view of one of the time devices showing its individual "in" and "out" indicator. Fig. 41 is an edge view of the mechanism shown in side view in Fig. 38. Fig. 42 is a view of a record sheet containing a number of records made upon the machine.

In order that the construction and operation of my improved machine, shown in the drawings, may be more readily understood, I will first describe, in a general way, the manner of its operation by an operator, and the results accomplished by such operation and also, in a general way, how such results are obtained, and then I will describe later on in detail the specific mechanism by which the results are obtained.

Upon the front of the case 1 of my machine is mounted a rotatable dial 4 provided with a hand-wheel 7 and bearing a series of numbers corresponding to the different operators for which the machine is adapted, each number having an individual "in" or "out" indicator or signal showing through its window 6 to indicate the condition of the machine with reference to its operation by the corresponding operator. On the back of the dial and integral with it are arranged a series of devices adapted to be set in accordance with any time and when thus set to represent such time and later in a subsequent operation by the same operator to control the subtracting movement of the elapsed time indicating mechanism in accordance with such time. For the sake of brevity and in order to readily distinguish them from other parts I shall hereafter refer to such devices as time devices. Three of these are shown in Fig. 14, namely, 218, 235 and 236. Each time device consists of a series of movable parts or pins as 229, 229 the hour pins, see Fig. 14; or as 38, 38 the tenths of hours pins, see Fig. 4, the pins representing different units of time adapted to be moved into a position to represent the time of a first or initial or "in" operation of the machine by a corresponding operator and to be retained or locked in such set position until a subsequent operation of the machine by the same operator. In the machine shown, each operator has two time devices, one for the hours and another for the tenths of hours. These are mounted in suitable frames, 173 being the hour frame and 37 the tenths of hours, as shown in Figs. 11 and 14. Both pin frames are fast to and form part of a larger sliding frame consisting of two sleeves 218 and 174, normally carried on rods 219 and 175 secured to the back of the dial and free to slide on the rods.

When an operator begins his day's work or begins a new job, he turns the dial 4, by means of handle 7, until the arrow at the top of his number on the dial is in register with the arrow on the casing 1, indicated at the top in Fig. 1. This operation brings his hour and tenths of hour time devices into the proper position for subsequent operations, the dotted position shown in Fig. 11, with rods 219 and 175 in alinement with rods 36 and 35 fast to the framework 21. It also rotates drum 17 (Fig. 3) carrying the record sheet 18 so as to bring upon the printing line the space on the record sheet corresponding to the number of the workman. The operator then pulls down the "in" and "out" lever 12 from its unlocked position, as shown in Fig. 1, to the notch opposite the word "In." This, through knob 214 on arm 213 engaging with lugs 217 dependent from frame 218, 174, slides frame 218 to the left, as viewed in Fig. 11, moving his two time devices, the hour 173 and the tenths of hours 37 into position to register with a setting device, 172 for the hours and 153 for the tenths of hours (see Figs. 6 and 8), ready for the setting up of the time of the "in" or initial operation upon the time devices. This position is not shown in Fig. 11, being midway between the dotted line position of the parts close to the dial, which is their normal position, and the full line position, which latter is the position assumed by the parts on a second or later operation by the same workman. The above movement of the "in" and "out" lever also locks the dial in position, preventing further rotation during the subsequent operation. The movement of the "in" and "out" lever has no effect on shaft 13 and record drum 17 as shaft 16 and drum 17 stand normally as viewed in Fig. 3 relative to the type wheels (401 the hour wheel and 121 the tenths of hours) and the printing devices so that the left half of the record drum or the part carrying the left half of the record sheet 18, shown in Fig. 42, are in printing position. This half of the record sheet is devoted to the printing of the time of the "in" operation, the right-hand half of the sheet being devoted to the printing of elapsed time. The operator then moves hand-wheel 8, so that one of the arrows indicated on it is opposite either "A. M." or "P. M." (printed on the hub of hand-wheel 7), as the case may be. This shifts drum 17 axially on its shaft 16 a slight distance so as to bring opposite the type wheels and printing devices either the "A. M." or "P. M." column of the left half of the record sheet, in accordance with the indication of the arrow of hand wheel 8. The machine is now ready for the setting up of a record or indication of the "in" or initial time of the operation by the workman upon his time devices and for the movement of the type wheels to indicate time-of-day and for the printing of such time upon the record sheet in the space devoted to the particular workman. This is accomplished by the workman pulling down handle 2 and letting it go, when it will automatically be returned to its original position. This operation of handle 2 reciprocates the main cam shaft 10 and operates various parts of the mechanism. Among them, it moves the type wheels one way, so that they will correspond with the position of time controlled time cams, 372 representing the hours and 374 the tenths of hours (Fig. 34), so that the type wheels will bring upon the printing line type representing the time of this first or initial operation of the machine. It also operates the setting devices 172 and 153, moving them first to the position indicating the hour and tenths of hours of the time of the operation so as to stand opposite the pin of the corresponding time device representing such time and causing them to set such pin by forcing it to the left, as shown in Fig. 7, where it is held in its locked position until a subsequent operation of the machine by the same operator. The operation of handle 2 also causes the individual "in" and "out" signal or indicator corresponding to the operator to change from "out" (which is its normal position before any operation of the machine by the operator) to its "in" position, thus indicating, at a glance, that the particular workman has begun his day's work or his job. The operation of handle 2 also actuates the printing devices. The operator then returns the "in" and "out" lever 12 to its original or uppermost position, shown in Fig. 1. This returns his time devices and all their connecting parts back to their original positions and unlocks the dial, whereupon the machine is ready for the next operation, either an "in" or "out" operation by another workman, or an "out" operation by the same workman.

The result of the above initial operation of the machine by the workman in question has been to print upon his horizontal column on the record sheet the time of his said operation of the machine and to set upon his time devices a record or indication of the time of such initial or first operation.

When the same operator has finished his day's work or his job, he moves the dial again so that his number is at the top, as viewed in Fig. 1, as before, thus bringing his time devices into proper position and rotating the drum to bring his space on the record sheet upon the printing line and pulls down the "in" and "out" lever 12 to the "out" position. This, in a similar manner, slides his time devices into a position to register with and to control means for moving the type wheels the reverse way to that in which they were moved on the first operation to indicate the time of day and again locks the dial and connecting parts. The workman then moves hand-wheel 8, if not already in its proper position, to shift the drum so as to bring the "A. M." or "P. M." column opposite the type wheels and printing devices. In pulling down the lever 12 to its lowest or "out" position, drum 17 has been shifted to the right, as viewed in Fig. 3, so as to bring the right-hand half of the record sheet opposite the printing devices and type wheels. The workman then pulls down handle 2. This causes the type wheels to be operated upon by the same means, previously referred to, controlled by the time cams, to an extent to indicate the time of day and also by the reverse operating means, viz., rack 176 for the hour wheel and rack 57 for the tenths of hour wheel. The extent of movement of these racks is controlled by the time devices, the racks being stopped in their downward movement by any pin that has been set or pushed outward on the first or initial operation of the machine by the same workman. In effect, this subtracts from the time of day of the second operation, the time of the first or initial operation, giving the elapsed time between the two. This time is printed upon the record sheet in either the "A. M." or "P. M." column on the right-hand side of the record sheet, as viewed in Fig. 42. The workman then returns the "in" and "out" lever to its unlocked position. The parts are now all returned to their original positions ready for the next operation. The result of the complete operation by the particular workman has been to print upon his particular line of the record sheet the time of the "in" or initial operation by him either under the "A. M." or "P. M." column on the left of the sheet and to print on the right half of the sheet the elapsed time between the two operations by him of the machine, or the time he has been at work. For example, the record sheet of Fig. 42 shows that workman No. 1 began work at 2.3 o'clock in the afternoon and worked for 1.6 hours. Workman 5, for example, began at 7 o'clock in the morning, and worked for five hours in the morning and began work in the afternoon at 1 p. m. and worked for four hours.

3 is a window in the front casing of the machine through which are visible the type on two time indicating disks 318 and 319 (Figs. 28 and 32), disk 318 giving the time in hours and disk 319 in tenths of hours. The time controlled operating mechanism for these wheels will be described later on.

I will now proceed to describe in detail the specific mechanism shown in the machine of the drawings and for the purposes of clearness I will take up the different parts of the machine in the order in which those parts are actuated by the successive acts of the workman in operating the machine, so far as that is possible and convenient.

The first act of the workman in the "in" operation is to rotate dial 4 to bring his number at the top of the dial. This act also brings the workman's individual time device to the top of the machine into a position where it can be shifted to register with the setting device, and it also rotates the record drum to bring the workman's individual space on the record sheet upon the printing line. Accordingly, I will first describe the dial and the time devices it carries and then the record drum and the devices for rotating it.

*The dial and the individual time devices.*—These are specially illustrated in Figs. 1, 3, 4–8 inclusive, 11, 14, and 38–41 inclusive.

4 is a rotatable dial mounted on sleeve 9, the latter encircling shaft 16 (Fig. 3). Dial 4 is mounted in the front casing of the machine 1 and is provided with a series of numbers 5, 5, one number being assigned to each workman. Dial 4 is turned by the workman by means of handwheel 7 fast to the dial. Each number on the dial is provided with an arrow to register with an arrow at the middle of the top of the front casing of the machine, as seen in Fig. 1. The dial is also provided with a series of individual indicators or "in" and "out" signals seen through windows 6, 6, one for each workman. Rotatable dial 4 forms a common movable support for a plurality of time devices, integral with the machine, for the individual workmen and is adapted to move the said time devices so that any desired one of them or set of them may be brought into proper position to be set in accordance with any particular point of time. In the machine shown, this is done by the workman rotating handle 7 until the arrow of his number on the dial registers with the arrow on the casing at the top of the machine.

The time devices shown consist of two series of time devices, one series for the hours and another series for the tenths of hours. Each individual workman has an hour time device and a tenths of hours time device. These are arranged on the back of the dial along the rim, as shown in Fig. 14. This figure shows three time devices, one at 218 in position at the top of the dial ready for operation, another at 235 and another at 236. Each time device consists of a number of separate movable pieces representing different units of time. As shown, these parts are pins carried in a frame. 173 is the hour frame and carries twelve pins 229, 229 (Figs. 11 and 38), a pin for each of the eleven hours and one for zero. 37 is the tenths of hour frame and carries ten pins 38, 38 (Figs. 6, 7 and 11), one pin being for zero. The two frames 173 and 37 form part of a larger frame composed of a sleeve 218 and a sleeve 174, frames 173 and 37 and cross-piece 402 connecting the two sleeves to form a single integral frame. This frame normally is carried on rods 175 and 219 fastened to the back of the dial (Fig. 11), sleeves 218 and 174 being free to slide on the rods 175 and 219, as will be subsequently described. Each pin is provided with two collars 44 and 39 and has a spring 40 to hold it or lock it in its set position, as shown in Fig. 7 (see also Fig. 5). Each workman has thus two individual time devices, one representing the hours and the other the tenths of hours, and these he brings into position by moving the dial until his time devices are at the top of the machine. In this position, rods 175 and 219 are brought into register with two rods 35 and 36, which are fast in the side casing 21 of the frame work of the machine. The frames 218 and 174, with the hour and minute frame 173 and 37, can then be slipped or shifted along the rods (see Fig. 11) to bring the two time devices into register, in the "in" operation of the machine, with a time controlled setting device which will set the particular pins of frames 173 and 37, which represent the hour and the tenths of hours of the time of the setting operation, and on a second or later operation of the machine by the same workman, they can be shifted to the "out" position, shown in full lines in Fig. 11, when the pins 229 and 38 will register with subtracting means or means for moving the type wheels the reverse way to that in which they were previously moved to indicate time-of-day. In this latter position, the time devices, through the pins which had been previously set to indicate the time of the first operation, control the movement of the subtracting means, as will be subsequently described.

*The drum and record sheet and means for rotating them.*—These are specially illustrated in Figs. 3, 19–27 inclusive and 42.

17 is a rotatable drum. It forms a movable support for the record sheet 18 and is adapted to be rotated so as to bring the proper horizontal space upon the record sheet 18 upon the printing line. Fig. 42 illustrates the record sheet employed in the machine shown. It is provided with a series of numbers 398, corresponding with those on the dial, one for each operator. The horizontal space opposite each number is reserved for a record of the time of the "in" or initial operation of the machine by the said operator and for a record of the elapsed time. As shown, two vertical columns 399, 399 are provided at the left side of the sheet, one for the "A. M." and the other for the "P. M." initial record, and on the right-hand side of the sheet there are provided two vertical columns 400, 400, one for the "A. M." and the other for the "P. M." elapsed time records between two operations of the machine by the said workman. Drum 17 is mounted fast on a sleeve 19 encircling and freely movable upon shaft 16. Shaft 16 is loosely mounted in bearings in side frame 21, in sleeve 19 and in the sleeve portion of part 9. Sleeve 19 is freely mounted in bearings in frame 22, forming part of the framework. 23 is also a part of the framework and at its right-hand end in Fig. 3 forms a cylindrical bearing for an inwardly projecting sleeve portion of dial 4. This sleeve portion of dial 4 is free to rotate in the said cylindrical bearing of 23. A pin 33, fast in shaft 16, projects into a slot 403 in the sleeve of dial 4, the slot being just the width of the pin. A pin 20, fast in shaft 16, projects into a slot 404 in sleeve 19, the width of the slot being the same as that of the pin (see Fig. 25). Whenever, therefore, dial 4 is rotated, it also, through its sleeve and pin 33, rotates shaft 16 and the latter, through pin 20 and sleeve 19, rotates drum 17. The record sheet 18 is so arranged on the drum that when any number on the dial is brought to the uppermost position with its arrow registering with the painted arrow on the front of the casing at the top, the space of the corresponding number representing the same workman on the record sheet is brought upon the printing line opposite the hour type wheel 401 and the tenths of hours type wheel 121.

Any suitable means may be employed for securing the record sheet to the drum. The particular devices shown for that purpose are illustrated in Figs. 20 and 23. As there shown, the record sheet is wound around the drum and the two ends are passed in through a slit in the drum between jaws 298 and 299. 297, 297 are two clamping screws for tightening the jaws to grip the ends of the paper. 294 and 302 are two short levers fast to a short stud 293 loose in one of the spokes of the drum. 296 is a rod connecting 294 and 302 and resting in notches in the ends of two dependent projections 405 of jaws 298. Lever arm 294 has at its outer end an interiorly screw-threaded opening, through which passes a threaded thumb-piece 295. One end of the screw rests against a block 301 forming a part of the drum. By turning thumb-screw 295 one way the paper is tightened, and the other way it is loosened on the drum.

When the operator turns hand-wheel 7, he rotates both the dial and the drum synchronously and correspondingly, so that whenever the time device or devices of any operator is moved into proper position for operation, either to have an initial record set upon the time device or later to enable it to control the movement of the elapsed time indicating type wheels in their subtracting movement, to be hereafter described, the space on the record sheet corresponding to the particular workman will be upon the printing line. As will be explained later on, the connections for this purpose are so arranged as to also permit an axial movement of the dial and the shaft relatively to each other and of the drum and shaft relatively to each other for purposes to be hereafter described.

The next operation by the workman in the "in" operation of the machine is to move the "in" and "out" lever 12 to its "in" position. This lever 12 projects downward through the front casing of the machine through a plate 11, which is provided with a vertical slot. Three notches 311 are provided in the plate 11 at the sides of the slot (Figs. 1 and 24), the uppermost one having against it the word "Unlocked," the next lower one the word "In" and the lowest one the word "Out." The lever 12 is held in any one of these positions by means of a locking piece pivoted to the lever at 309 and having a nose 312 adapted to enter the notches 311 and an operating spring-pressed handle 310, secured to the handle of lever 12. By pressing the handle 310 inward toward lever 12, nose 312 is removed from any notch it may be in and the lever can be moved to any other notch. Normally the lever stands with the nose 312 in the uppermost notch 311, in the position shown in Fig. 24.

The movement by the operator of the lever from this position to the middle notch moves the time devices of the particular operator into position to have them set in accordance with the time of the initial or "in" operation by the operator, this movement bringing the said time devices into register or operative connection with a time controlled setting device. It does not, however, move or shift the drum as that stands normally so as to bring opposite the type wheels the part of the record sheet devoted to a record of the time of the "in" or initial operation; or in other words, the left half of the record sheet 18, as shown in Fig. 42. The means for thus shifting the time devices will now be described.

*The "in" and "out" lever and its connections for shifting the time devices.*— These are specially illustrated in Figs. 1, 2, 3, 8, 11, 14 and 24.

Lever 12 is fast to shaft 303 secured in the framework of the machine. Arm 308 is also fast to shaft 303 and has a slot 313 at its outer end, in which works pivot 314 in the end of arm 106 fast at its other end to shaft 64 journaled in a bracket of side frame 21 (Fig. 24). 72 (Fig. 11) is an arm fast to shaft 64 and has pivoted to it, at 215, link 213, the latter pivoted at its other end to block 212 at knob 214. This knob is adapted to engage two dependent lugs 217, 217 of sleeve 218 of the frame 174 carrying the time device frames 173 and 37. Block 212 is a sleeve adapted to slide upon stationary rod 54 projecting from side frame 21. Block 212 has a tail-piece 211, forked at its lower end to embrace stationary rod 55, also secured to side frame 21 to steady block 212 and prevent its tilting and to steady its reciprocating movement along rod 54. The normal position of frame 174, with its time frames 173 and 37, is close to the back of the dial 4, in the position shown in dotted lines at the right of Fig. 11. When lever 12 is in its uppermost position, block 212 is at the extreme right, as viewed in Fig. 11, with knob 214, in the position shown in dotted lines. In this position of the parts, dial 4 is free to rotate and the dependent lugs 217, 217 of each time frame, pass on either side of knob 214. It will, of course, be understood that the time devices and frames for each operator are similar in all respects to the one already described. Each of these time devices and frames have similar stationary rods 175 and 219 projecting from the back of the dial, upon which they are normally carried. When a set of time devices and their frames are in proper position at the top of the dial, as already described, the operator seizes lever 12, then in its uppermost position, unlocks it and moves it downward into the middle notch 311 into the "in" position. This movement of the lever through arms 308 and 106, shaft 64, arm 72 and link 213 moves block 212 and knob 214 to the left, through knob 214 engaging left-hand lug 217. This moves the time frame to the left, partially off of rods 175 and 219 and partially upon the registering rods 35 and 36, which are stationary rods secured to the side casing 21. The time frame 174 and the hour time frame 173 and the tenths of hours time frame 37 will then occupy a position about midway between the dotted line position shown at the right in Fig. 11 and the full line position of the parts (the "out" position) shown at the left in that figure. This has moved the time frames 173 and 37 opposite to and in register with two setting devices, 172 for the hours and 153 for the tenths of hours (Fig. 8). The time devices are now in position to have operative connection with these setting devices. The latter are controlled by timing cams, to be presently described, so that when operated the setting devices will select and set that one of the pins in each of the two time devices which represent the hour and the tenth of hours of the time of the setting or first operation of the machine, and later upon the operation of handle 2 by the workman, these devices will set such pins in position, so that at a second operation of the machine they will control the operation of the elapsed time type wheels in their subtracting movement, as will be described later on. At the end of the first operation of the machine, the operator returns the "in" and "out" lever 12 to its original unlocked position, and this through the mechanism already described returns the time frame and its time devices to their normal position close to the back of the dial ready for the next operation of the machine.

After a workman has moved the lever 12 to its "in" position, any further rotation of the dial or record drum is prevented by the sleeves 218 and 174 overlapping the rods 175 and 35 and the rods 219 and 36.

In the second or "out" operation of the machine by any workman, the lever 12, when released from its unlocked position, is carried downward to its lowest position, or until nose 312 enters the lowest notch 311. By the devices already described, this moves frame 218 and 174 still farther to the left than they were moved in the "in" position, so that they will occupy the position shown in full lines in Fig. 11, at the left of that figure. This will bring the time frames 173 and 37 into register or operative connection with two devices for moving the type wheels in their reverse or subtracting direction and, by means presently to be described, the time devices will control the extent of such movement in accordance with the "in" or initial record that had been previously set upon them when the same workman operated the machine in the "in" or initial operation just described. In this position of the parts, I provide extensions or locking pieces 216, 216 of sleeve 218, projecting from opposite sides of that sleeve to overlap the ends of stationary rod 219, as shown in full lines in Fig. 11.

*The "in" and "out" lever and connecting parts for shifting the record drum.*—These are specially illustrated in Figs. 1, 2, 3 and 24.

The operation of lever 12 from its unlocked to its "in" position, already described, has no effect on the position of the record drum as the left half of the record sheet 18, shown in Fig. 42, lies normally opposite the type wheels and is accordingly in proper position already for the printing of the "in" or initial time. 304 is fast to shaft 303 and has at its outer end a slot 306, through which projects a pin 305 secured to link 307. The latter, at its other end, is pivoted at 316 to a short lever 407. Lever 407 is fast to shaft 13 and has a projecting portion 408, to which is fastened spring 14, the latter fastened at its other end to a bracket 409 from the side casing 21. Spring 14 normally holds the parts in the position shown in Fig. 24. Fast on shaft 13 is also an arm 410 (Fig. 3), the end of which lies in an opening 15 between two collars 411 fast on the left end of shaft 16. Slot 306 in piece 304 is provided to permit lever 12 to move from its unlocked position to its "in" position, without movement of the record cylinder. This is all that is done by lever 12 on the "in" operation of the machine so far as concerns the position of the record drum, but as lever 12 in the "out" operation does shift the record drum, this operation will, for the sake of convenience, be now described. Such further movement of shaft 12 to its lowest or "out" position will, by the means just described, cause shaft 16 to be moved bodily to the right, as viewed in Fig. 3, moving drum 17 so as to bring the right half of the record sheet opposite the type wheels. To allow of this movement of shaft 16, slot 403 in the inwardly extending sleeve of dial 4 is provided and shaft 16 is free to move to the right a considerable distance inside of the sleeve of 4 and of the sleeve of part 9, as clearly illustrated in Fig. 3. The position of the shaft and drum, as shown in Fig. 3, is that when lever 12 is in its uppermost or unlocked position, the drum being in its "in" position.

The next act of the workman in the "in" operation is to move the "A. M." and "P. M." hand-wheel 8 to indicate the forenoon or the afternoon, as the case may be, unless of course the hand-wheel happens to stand in the right position originally. This movement of hand-wheel 8 will move the proper A. M. or P. M. column of the record sheet opposite to the type wheels or printing devices. The particular mechanism shown for this purpose I will now describe.

*The "A. M." and "P. M." wheel and connecting parts.*—These are specially illustrated in Figs 1, 3, 19, 21, 22, 26 and 27.

Hand-wheel 8 is arranged so that normally it will rotate with hand-wheel 4, but it is free to have a slight circumferential movement with reference to hand-wheel 4. This is for the purpose of giving a slight axial movement to drum 17 and its record sheet relative to shaft 16 to bring the proper A. M. or P. M. column opposite the type wheels.

Hand-wheel 8 is provided with a series of arrows 32 adapted to register with alternate A. M. and P. M. letters arranged on the hub of wheel 7, as shown in Fig. 1. Hand-wheel 8 is rigidly fastened to the inwardly extending sleeve of part 9, which encircles the right-hand end of shaft 16 (Fig. 3), by means of a pin 34 driven through the end of the sleeve and the hub of the wheel. An impositive lock (Figs. 19 and 21) between the inwardly extending hub of dial 4 and the sleeve of part 9 causes hand-wheel 8 normally to rotate with the dial. This lock consists of a ball 289 resting in one or the other of two slight depressions 292, 292 in sleeve 9, against which ball a spring 291 presses, the latter held in position and its tension regulated by a screw-threaded cap 290, having exterior threads meshing with interior threads in a cylindrical hole in the sleeve of dial 4. The impositive lock permits hand-wheel 8 to be turned a slight distance circumferentially with respect to dial 4. Slot 403 in sleeve 9 for pin 33 is made slightly wider than that pin, as shown in Fig. 22, for the purpose of permitting this relative circumferential movement. This slight circumferential movement of hand-wheel 8 and part 9 relative to dial 4 causes a slight axial movement of drum 17 relative to shaft 16. The particular devices which accomplish this result consist of a cam 26 loosely supported on pins 31 secured to and projecting from the left-hand end of part 9. These pins enter cylindrical openings in the cam, the latter being free to slide on the pins. 24 is a member fast on sleeve 19 for supporting cam rollers 25. These fit into cylindrical openings in the circumference of cam 26 and are mounted on hub 24 so as to be free to rotate thereon.

Cam 26 is provided with two sets of nuts 29 and 30 to prevent its getting out of position on the shaft, these two sets of nuts being interiorly screw-threaded to engage with exterior screw-threads 27 and 28 on shaft 16. Slot 404 in sleeve 19 is made of sufficient length to permit this slight axial movement of sleeve 19 and drum 17 relative to shaft 16. Sleeve 19 is made of such a size that it works freely on shaft 16 and also freely in side frame 22.

By the above described mechanism, a rotary movement of wheel 7 and dial 4 is imparted to shaft 16, hand-wheel 8, sleeve 9, drum 17 and all their connecting parts. If hand-wheel 8 is moved either to the right or left while dial 4 remains stationary, drum 17 and shaft 16 will be moved a slight distance axially relative to each other for the purpose described.

The next act of the workman in the "in" operation is to pull down operating handle 2 to its lowest position. This operation moves the main cam shaft 10 of the machine and through it effects a number of operations, including the moving of the type wheels to represent the time-of-day in accordance with the position of certain time controlled cams, the moving of the setting devices into position to select for actuation the proper pins of the time devices representing the time of the operation, the moving of the "in" and "out" signal of the workman from its normal or "out" position to its "in" position, and the operation of the setting devices and printing devices. The particular mechanism shown for accomplishing each of these results will now be described in order.

*Impulse mechanism.*—This is specially illustrated in Figs. 1, 2 and 18.

Any suitable impulse mechanism may, of course, be used. That shown is as follows: Handle 2 is fast on shaft 188. Also fast on the shaft is an arm 288. 10 is the main driving or cam shaft. 266 is a sector gear fast upon it, meshing with a sector 267 fast on shaft 265. The latter shaft carries fast to it three arms, arm 274, to which at 276 is pivoted spring 279, pivoted at 278 to the framework for the purpose of returning the parts to their normal position after the operator has pulled handle 2 downward; arm 273, to which at 275 is pivoted piston rod 412 of a dash-pot controller 277 for preventing a too sudden operation of cam shaft 10 and its connecting parts; and arm 268, to the other end of which at 271 is pivoted a link 272 and to which is also pivoted at 269 impulse spring 270, the latter being pivoted at its other end at 286 to arm 288. As any suitable dash-pot may be used, and as its construction forms no part of the present invention, the details of dash-pot controller 277 are not shown. As shaft 188 is rotated to the right, in the direction of the arrow in Fig. 18, cam shaft 10 will be moved in the direction of its arrow through impulse spring 270. This, together with the dash-pot controller, will prevent a too sudden and injurious movement of cam shaft 10. In case the workman operates handle 2 too fast, the nose 413 of arm 288 will catch in the latch at the right-hand end of latch 283, which is pivoted on stud pin 283' in the casting 281 and arm 288 will be prevented from returning to its original position until the slower movement of shaft 10 and its accompanying parts, including arm 268 and link 272, will cause block 280 on the link to strike a pin 284' on latch 283 and rock it up against the tension of spring 282 so as to free the nose 413 of arm 288 from latch 283 and permit the parts to return to their normal positions. 285 is a pin on arm 288, moving in slot 287 of link 272 to facilitate the operation of the parts. 284 is a stop for latch 283. It will, of course, be understood that spring 270 is strong enough to overcome return spring 279.

*The type wheels, timing cams and connections and means for moving the type wheels to represent time-of-day.*—Any suitable time indicating mechanism may be employed. In the machine shown, the time indication is given by printing a record from type wheels upon a record sheet, although any other suitable means of indicating may be employed, if desired. Two type wheels only are shown in the drawings, an hour type wheel 401 and a tenths of hours type wheel 121 (Fig. 15, see also Fig. 4ª). These type wheels are employed either to print the time-of-day, as for example, the time of a first or initial operation of the machine, or elapsed time. In the particular form of machine shown, the "in" time is printed at the first operation of the machine by these type wheels and the elapsed time at the second or "out" operation of the machine is printed by them. Preferably, these wheels stand at zero and are moved to correspond with either time-of-day, the position they occupy in the printing of the time of the "in" operation, or are moved to a position which is the resultant of the time-of-day position with the time of the first or initial operation of the machine subtracted from it, or in other words, a resultant position representing the elapsed time between the two operations of the machine. It will be understood, of course, that other indicating or recording mechanism may be employed than that shown and that the time-of-day indications or records and those of elapsed time may be obtained in other ways. At least for some features of my invention, it is not limited to indicating mechanism normally at zero or to type wheels or to the particular mechanism shown in the drawings, nor is it limited to any special means for actuating the indicating mechanism. I prefer, however, to use type wheels normally at zero and timing cams actuated by magnetic timing devices for controlling the time movements of the type wheels. I will now proceed to describe the timing cams and the means for driving them. These are specially illustrated in Figs. 6 and 28–34 inclusive.

321 is a magnet with its frame 351 secured to piece 349 forming part of the framework of the machine. 341 is its armature. Magnet 321 is connected in any suitable way with clock mechanism and electric circuits so that at every tenth of an hour the magnet will be energized and its armature 341 raised and will be immediately dropped again. As such constructions are now well known and form no part of this invention, they are not shown. 337 is a pin attached to a dependent lug 340 fast to armature 341, pin 337 working in a slot in an arm 339 pivoted at 338 to the framework. Fast to arm 339 is another arm 336 pivoted at 343 to a link 342, the latter being pivoted at 344 to a frame consisting of side pieces 357, 367 connected by bar 414, loose on shaft 352. At every actuation of the magnet, frame 357, 367, is lifted and dropped. Frame 357, 367 carries two pawls, a pawl 415 engaging the teeth of tenths of hours ratchet 358 and a pawl 416 adapted, when permitted, to engage the teeth of hour ratchet 326, these pawls being mounted on stud shaft 323. Ratchet 358 is fast on a sleeve 363, loose on shaft 352. Sleeve 363 also carries fast to it a sprocket 359 and a disk 322, provided with a notch 325. 320 is a chain engaging the teeth of sprocket 359 and passing over a sprocket 369 fast on sleeve 370 loose on shaft 67. Sleeve 370 also has fast on it the timing cam 374 representing the tenths of hours. Every time frame 357, 367 is reciprocated by magnet 321, pawl 415, through ratchets 358, sprocket 359 and sprocket 369, feeds forward the tenths of hour cam 374 one tenth of a revolution. Accordingly, the position of that cam (see also Fig. 36) will represent the true time in tenths of hours. The hour cam 372 is also driven by magnet 321 through pawl 415 and ratchet 358 by the following mechanism. Ratchet 416 is normally held out of engagement with the hour ratchet 326. At every complete revolution, however, of disk 322, fast to ratchet 358, a pawl 324 fast to stud shaft 323, journaled in the two side parts of frame 357, is permitted to drop into notch 325. Also fast on stud 323 is pawl 416. When pawl 324 drops into notch 325, pawl 416 engages with hour ratchet 326. Of course, pawl 416 is actuated by frame 357, 367, in the same manner as pawl 415. Springs 417 and 418 normally tend to hold pawls 415 and 416 in their engaging position. By the above mechanism, ratchet 326 is fed forward one tooth at each revolution of the tenths of hour ratchet 358. Pinned on shaft 352 is sprocket 360, over which a chain 361 runs to sprocket 368, which is fast on sleeve 371, carrying the hour cam 372 and also pinned to shaft 352 is hour ratchet 326. 371 is loose on shaft 67. Thus the hour cam 372 is moved one point every hour. 353 is a counterweight on the side 367 of frame 357, 367 to make the operation of the parts by magnet 321 easier. 329 is a dash-pot controller. It is pivoted to one end of frame 357 through its piston rod 328. 332 is the piston, which is provided with a small orifice 331 for the passage through it of the oil 333. 330 is a screw-threaded cap for preventing the escape of the oil. Controller 329 has a downward projection 334, which is pivoted to the framework at 335 to permit a slight rocking of the controller. The controller is to prevent the too sudden operation of the parts. 347 is a pawl pivoted to the framework at 348 and held by spring 346 in engagement with ratchet 358 to prevent backward rotation. 318 is an hour indicating disk and 319 a tenths of hour indicating disk. These two disks serve to give a visual indication of the time-of-day through window 3 in the front casing of the machine, as shown in Fig. 1. Hour wheel 318 is driven from hour ratchet 326 through shaft 352, upon which both the ratchet wheel and 318 are keyed. Disk 319 is fast to sleeve 355, which carries the tenths of hours driving ratchet 358.

By the above described means the hour cam 372 is driven to correctly represent the hour and the tenths of hour cam 374 to correctly represent the tenths of hours. These time cams are thus always positioned in accordance with the true time. These cams control the position into which the type wheels and the setting devices are moved whenever operating handle 2 is depressed. I will now describe the mechanism by which these cams control the time-of-day movement of type wheels 401 and 121. These means, controlled by the time cams, enable the type wheels, which stand normally at zero, to be moved at each operation of the machine to an extent in accordance with the time of such operation. On the initial or "in" operation of the machine, they are thus moved to indicate true time and in this position they print such time upon the record sheet. In the second or "out" operation of the machine, the type wheels are similarly moved an extent to correspond with the time-of-day or time of such operation, but are also moved the reverse way or in the subtracting direction to subtract from such time-of-day the time of the first or initial operation. I will now describe the means, controlled by the time cams, for imparting such time-of-day movement to the type wheels. These are illustrated in Figs. 4, 4ª, 9, 10, 15, 17 and 34–37.

Each type wheel is controlled and moved by similar devices. 374, the cam for the tenths of hours, carries fast to it a disk 375, with numerals to represent the hour of the different positions of the cam. A similar disk 373 is secured to the hour cam 372. Normally resting against each cam is the nose of a cam wiper. That for cam 374 is shown in Figs. 35 and 36 as 378. It is loosely mounted on shaft 68 and has a tail 381 provided with a spring 377 secured to the framework at 376 to normally hold the nose of the wiper against the cam surface. 378 is provided with gear teeth 379 adapted to engage the teeth 380 of one end of a toothed sector 204 loose on shaft 85. The hour cam 372 is provided with a corresponding wiper which meshes with a similar sector 205. The position of the sectors 204 and 205 at any time will normally depend upon the position of their corresponding time cams 374 and 372, the sectors being moved toward the left, as viewed in Fig. 36, as shown by the arrow in that figure, as the hours and tenths of hours increase in number. The sectors 204 and 205 are moved, through handle 2, by means of a common frame, consisting of two side pieces 87 and 203 (Fig. 10) fast to shaft 85 and connected at one end by a rod 86 and at the other end by a rod 88. Upon rod 88 are loosely mounted two pawls 419 and 420. When the parts are in the unoperated position, as shown in Fig. 4ª, the right-hand end of these pawls engage a stationary rod 89 secured in the side frames 21 and 22 and in this position the left-hand nose of each pawl is out of engagement with its corresponding sectors 204 and 205. Frame 87 and 203 is rocked by handle 2 by means of a cam 184 (Fig. 17) which when handle 2 is depressed, moves in a contra-clockwise direction, rocking bell crank 186 on shaft 107 against the tension of spring 189 fastened at 190 to a stud from the framework. A roller 185 bears against the surface of cam 184. Bell crank 186 at its upper end is provided with sector teeth 421 meshing with the sector teeth on arm 187 fast on shaft 85. Thus the shaft and with it frame 87, 203, are reciprocated at each operation of handle 2. This moves the frame 87, 203 to the left, as shown in Fig. 4ª. The moment the pawls 419 and 420 are freed from rod 89, the left-hand nose of each impelled by a spring 93 engages its corresponding sector 204, 205, rocking the sector to the left, as viewed in Fig. 36. The extent of movement of frame 87, 203 is always the same, (notch 92 in each pawl 419, 420 engaging stop bar 82 at the extreme left of the movement), but the distance to which it moves the sectors 204, 205 will depend upon the position of those sectors at the moment the two pawls engage with them. Sectors 204 and 205, except in their zero position, will in their movement to the left, strike pins 83 or 201 on sectors 84 and 202. These sectors are provided with a series of teeth, shown on one of them in Fig. 4ª as 422, which mesh with corresponding teeth 138, with racks 81 and 182. Each of these racks is provided with slots 96 and 423, through which stationary shafts 94 and 424, secured between side frames 21 and 22, project to act as supports or guides. Each rack is provided with a toothed rack 137 adapted to mesh with a toothed wheel 98 fast respectively with floating differential wheels, 97 for the tenths of hours and 181 for the hours. These differentials are loosely mounted on studs 95 and 180 respectively, each fast to a rocking frame 100 and 177 respectively, loose on shaft 112. Springs 101 and 178 are secured at one end to stationary shaft 102 secured in the side frames, and at the other ends respectively to frames 100 and 177 to restore the parts to their normal or zero positions after an operation. Each frame is connected with a horizontal rack, 124 for the tenths of hours and 246 for the hours, by means of a slot in the lower end of one arm of the frame engaging a pin 127 projecting from its corresponding rack (Fig. 4ª). The horizontal racks are free to move horizontally, being provided for that purpose with two slots 125 and 126, through which project stationary shafts 123 and 131 respectively. These serve to permit such movement and to guide the horizontal racks. Each rack is provided with a set of teeth 120 on its lower face, meshing with a gear wheel 247 and 425 respectively. Gear wheel 247 is fast to a sleeve 426 loose on a short shaft 122 projecting from the two sides 130 and 427 of a rocking printing frame. These two sides are connected at one end by shaft 123 and are loosely mounted at the other end on shaft 131. The tenths of hour type wheel 121 is fast on the same sleeve 426 that carries gear 247. The hour wheel 401 is fast on a similar sleeve 428 loose on shaft 122 and sleeve 428 has fast to it a similar gear 425 meshing with hour rack 246. The rocking frame 130, 427 is rocked downward for the printing operation by means presently to be described. As the racks 81 and 182 are moved upward in accordance with the position of the time cams 374 and 372 by the mechanism already described, the two differential wheels 97 and 181 are rotated. In the "in" operation of the machine, this has the effect to raise the differentials in accordance with the position of the time cams. This raising of the differentials is caused by their gear wheels 98 rotating and engaging with teeth 136 of vertical subtracting racks 70 and 183 respectively. At each operation of handle 2 these subtracting racks and their accompanying parts are permitted to fall, by means presently to be described. In the first or initial operation of the machine they always fall their full length and the number of teeth 136 on these racks is such as to exactly rotate the corresponding differential a half revolution. As each one of these racks is provided with half the number of teeth on the tenths of hours and hours differentials respectively, this falling operation has no effect upon the actuation by the differentials of the type wheels in their indication. In the second operation of the machine by a workman the extent of their falling movement is dependent upon the setting of the time devices, as will be presently described, in accordance with the time of the first or "in" operation of the machine. In the first or initial operation, however, as has been stated, the falling operation of the subtracting racks has no effect on the position of the differentials or printing wheels, so far as the time-of-day movement or adding movement given to them through racks 81 and 182 is concerned. The effect of this adding movement is, therefore, to move the differentials 97 and 181 upward a distance corresponding to the relative positions of the two time cams 374 and 372, rocking the two frames 100 and 177 and moving the horizontal racks 124 and 246 a corresponding amount and turning the two type wheels 121 and 401 a similar amount, thus bringing upon the printing line type representing the hours and tenths of hours of the true time corresponding to the position of cams 372 and 374 at that moment. Thereafter, as will be presently described, rocking frame 130, 427, will be tilted downward and an impression of such hour and tenth of hour will be made upon the record sheet in the appropriate horizontal and vertical columns.

It will, of course, be understood that the effect upon the differentials of the downward movement of the subtracting racks and the upward movement of the adding or time-of-day racks will be the same whether these racks move simultaneously or successively. The resultant of the two movements will be the operative movement that will give the time indication on the type wheels. The adding or time-of-day movement in the first or initial operation of the machine is the only movement that will have any effect upon the differentials or type wheels.

In the return movement of the parts, rod 86 of frame 87, 203 (Figs. 4ª, 10) will strike sectors 84 and 202 and move them and their connecting parts back to their original positions. During the time-of-day operation of the parts described, the nose of each wiper is removed from its cam, as shown in Fig. 35, so that no matter how long a time the printing operation consumes, there will be no interference with the continuous time movement of the time cams.

The movement of handle 2 in the "in" operation of the machine also actuates the setting devices for setting the time devices in accordance with the positions of the time cams at that time, or in other words, in accordance with the time of the "in" or first operation of the machine. This actuation consists of two distinct steps, first the moving of the setting devices into a position to select the movable part or pin of the time devices corresponding with the time of the operation, and secondly, later on to effect the actual setting of such pins.

*The setting devices and their selecting means.*—In the first or selecting operation, the extent of movement of the setting devices is controlled by the two time cams respectively. The first or selecting operation is specially illustrated in Figs. 4, 4ª, 6, 7, 8 and 10.

172 and 153 are the selective fingers of the setting devices, 172 for the hours and 153 for the tenths of hours. These are operated by the hour and tenths of hours cam to the same extent that the latter actuate the time-of-day racks 182 and 81. This is accomplished, as shown, by means of cross-overs from the time-of-day sectors 202 and 84 respectively. The devices in each case are similar. Sector 84 has fast to it a dependent part 141, carrying at its lower end a cross-over 90, which at its other end is secured to a toothed sector 207 (Figs. 10, 4ª and 6). The teeth of sector 207 mesh with a gear 151 loose on shaft 150, the latter gear meshing with the teeth 152 of finger 153. 166 is a spring mounted on plate 165 fast to the hub of shaft 150 to keep finger 152 in mesh with gear 151. Finger 153, at its upper end, projects toward the right into a slot in plate 162, the latter secured to a back plate 161 by the two blocks 163 and 164 at the bottom and top respectively. Pin 154 projects sidewise from finger 152 to keep the finger in the slot. On its other side at the upper end, finger 153 has a nose opposite the collars 44 on pins 38. Finger 153 is free to move down and up into register with any one of the pins. Its normal position is at the top, as shown in Fig. 6. As sector 84 swings, as previously described, the same extent of movement is imparted through 141, 90, 207 and 151 to finger 153, bringing it downward corresponding in extent to such a movement. The nose of finger 153 will be brought opposite or into register with that one of pins 38 representing the time in tenths of hours. When later on finger 153 is forced to the left, as viewed in Fig. 6, it will push that particular pin to the left and set it, thus setting on the time device a pin corresponding with the time in tenths of hours of the first operation of the machine. A similar connection is provided between sector 202 and hour selecting finger 172. Of this, 91 is the cross-over, running from hour sector 202 to sector 206, which engages a gear corresponding to gear 151 but meshing with hour finger 172.

*The operating mechanism for the setting devices.*—These are specially illustrated in Figs. 6, 7, 8, 17 and 17ª.

For the purpose of operating the setting mechanism, plate 161 is forced to the left, as viewed in Fig. 6, by a toggle mechanism 167. 161 is loosely supported for this purpose by stud 171 from the plate 170 projecting into slot 179 in bracket 170 secured to side frame 21. This toggle mechanism consists of two sets of arms 168 and 169 connected by pieces 167, pivoted to them at 155. The arms 169 are secured respectively to shafts 159 and 160 freely journaled in the side frames of the machine. Arms 168 are pivoted to plate 161 at 157 and 158. Fast on shaft 160 is an arm 192 (Fig. 17ª), pivoted at 191 to a link 193, the latter pivoted at 194 (Fig. 17) to an arm 195, fast on shaft 118. Shaft 118 is rocked during the movement of the handle by means presently to be described so as to straighten out the toggle and force both of the selecting fingers 172 and 153 to the left, as viewed in Fig. 6, thus forcing one of the pins to the left into its setting position. This position is illustrated in Fig. 7. When a pin has been moved into that position, its collar 39 has passed its spring 40 and this spring, through friction, holds the pin in its set position until a later operation of the machine by the workman, when the pin is forced back to its normal position. This latter or restoring operation does not take place until the out operation of the machine, but for convenience it will be here described. This is effected by the following mechanism illustrated in Figs 4, 4ª, 6 and 11. Parallel to the rod 35 is a short shaft 46, upon which is mounted a lever 41, which has pivoted to its other end the universal bar 42. This bar is pivoted at its other end, at 48, to a second lever 43, fastened to a similar short shaft 47 parallel to the rod 36. This construction gives a parallel backward and forward motion to universal bar 42. Whenever a pin is pushed in, its collar 44 forces the universal bar inward, as shown in Fig. 7. A similar universal bar 42, carried on similar levers 41 and 43 pivoted to 46 and 47, is provided for the hour pins 229. At the opposite end of shaft 47 is a hooked lever 53 for returning the pins 38 and 229 to their normal positions. Mounted freely on rod 36 is bell crank lever 51, which has a pin 49 at its upper end. This pin is of such a length that it will engage lever 53 when the pin box is in the "out" position, as shown in Fig. 11. When this engagement takes place, shafts 46 and 47 are rocked to the right, as viewed in Fig. 4, forcing universal bars 42 to the right and through collars 44 of the set pins 38 and 229, restoring them to their original positions. Pivoted to one end of bell crank 51 is link 52, pivoted at 116 (Fig. 4ª) to an arm 117, fast to shaft 118. During the "out" operation, when pin 49 and hook 53 are in alinement, the reciprocation of shaft 118, by means presently to be described, will cause the said return operation of the pin to its normal position. It will be understood that when the frame of the time devices, however, is in the "in" position, this operation will not be accomplished, as pin 49 and hook 53 are not then in alinement. The operation of the handle has thus set each setting device in register with the appropriate pin and has later caused it to set that pin into operative position, such as shown in Fig. 7, with the pin projecting to the left outside of its time frame. The pin remains in this set position when the time devices are returned at the end of the "in" operation and it so remains until a subsequent operation of the same workman. At such subsequent operation, the time device is moved into register with the subtracting mechanism and limits or controls the extent of its movement in order to subtract the initial time from the time of such subsequent operation of the machine and thus give an indication of the exact time between the two operations, after which operation the pin is returned to its normal position, as already described. The "in" operation of handle 2 also moves the individual "in" and "out" signal of the workman from its "out" or normal position to its "in" indication. The mechanism shown for this purpose I will now desribe.

*"In" and "out" signal and operating mechanism.*—These are specially illustrated in Figs. 1, 4, 8, 11, 40 and 41. A series of these signals is provided, one for each operator. Their purpose is to indicate the condition of the machine, as to whether it has been last operated by any particular workman on the "in" operation or the "out". A series of windows 6 are arranged concentrically around the dial, one for each workman's number, as shown in Fig. 1. Each signal is adapted to show either the word "In" or the word "Out". Of course, any other suitable words or any other suitable way of giving a signal or indication might be employed. These signals stand normally with the word "Out" showing, as represented opposite the workman No. 5 in Fig. 1. The machine is so arranged that whenever a workman operates it in the "in" operation, his particular signal will change from "out" to "in" and upon a second or later operation by the same workman, his signal will change back from "in" to "out".

The specific signals and their connections for operating them, shown in the drawings, are as follows: Fast to rod 46 (Fig. 40) is arm 392, which carries at its lower end disk 395 bearing the word "In" or some other suitable designation or color. Every time universal bar 42 is pushed inward by the setting of a time pin, as already described, disk 395 will be rotated to the right by the rocking of shaft 46, as viewed in Fig. 40, and will cover disk 393 secured to metal piece 394, the latter held by rivets 397 to frame 402. Disk 393 bears any suitable representation or color, as shown the word "Out." In the normal or unoperated condition of the machine, this disk is immediately back of its individual window 6. A similar window is, of course, provided for the signal of each operator. During the second operation of the machine by a workman, universal bar 42 is forced to the right, rocking shaft 46 and removing the "in" disk to the left from in front of the "out" disk. In this position of the "in" disk it will not show through window 6. A mere casual glance at dial 4 will show which workmen are in and which are out. The movement of handle 2 on the "in" operation of the machine, as also on the "out" operation, actuates the printing devices, which will now be described.

*Printing devices.*—Any suitable printing devices may be employed. Those shown are illustrated in Figs. 4ᵃ and 15. 143 is a cam on main shaft 10. A roller 148 on the upper end of arm 149, pivoted on shaft 107, rests on the face of the cam and is normally held against it by spring 108 secured to the framework at 111 and to the lower end of arm 149. 109 is a link pivoted at 110 to arm 149 and pivoted at 129 to a plate 429 fast on shaft 118. 120 is a link pivoted at 119 to plate 429, and pivoted at its lower end to shaft 122 carrying the type wheels. Link 120 and frame 429 constitute a toggle lever, and when arm 149 is rocked to the right, viewed in Fig. 4ᵃ, by cam 143, the toggle is straightened out and the printing frame 130, 427, shaft 122 and the type wheels 401 and 121 are forced downward, the two type wheels being forced against the ink ribbon 134 and the record sheet 18.

Any suitable inking ribbon and feeding connections may be used. I have merely shown in the drawings a manually operated means for such feeding. It is illustrated in Figs. 4ᵃ and 15. 134 is the ink ribbon, which is carried on two ribbon spools 430 and 431, of the usual construction. The ribbon 134 is unwound from one, passes under idler 133, loose in brackets 251 and 252 of the side frames, then takes a right angle turn through a slot 432 in plate 237 running across from frames 21 to 22, the ribbon passing across over the plate and making another right angle turn through a similar slot 432 in the other end of the plate and passing to the other spool. The ribbon is wound upon one and thereby unwound from the other spool and vice versa by means of a handle 238 fast on a shaft 132 journaled in side frames 21 and 22. An impositive lock 239 and 240 holds the shaft ordinarily from axial movement. The entire handle and shaft may be pushed inward a slight distance, however, to shift one of the two gears 243 and 244, fast on the shaft, into engagement with a gear wheel 242 or 245 respectively and to throw the other gear out of mesh. Gear 242 and spool 430 are fast on sleeve 433 and loose on shaft 131. Similarly, gear 245 is fast with spool 431 on sleeve 434, this sleeve being loose on shaft 131.

When the workman has depressed lever 2 to its fullest extent, he lets it go, whereupon spring 279 (Fig. 18) returns it and its connecting parts to their original positions. Certain other parts are returned by the different springs, which have been previously described. The workman now moves lever 12 from its "in" position to its uppermost or unlocked position. This returns the time devices to their original position just back of the dial, and unlocks the dial. The time pins that have been set on the workman's time devices, however, remain set until a subsequent operation of the machine by the same workman at the close of the day or at the close of his job. The machine is now ready for an operation by any other workman and either for an "in" operation or an "out" operation, or is ready at any time for a subsequent "out" operation by the same workman. At each "in" operation of the machine by other workmen, additional time devices corresponding to the workman are set in accordance with the times of such operation. Any of the time devices thus set are adapted at the proper time and when brought to the proper place to effect the elapsed time indicating mechanism in its movement one way, as in its subtracting movement, as will be presently described.

The effect of the "in" operation, thus described in detail, has been to print upon the record sheet in the individual horizontal space, reserved for the particular workman, the time of such initial or "in" operation of the machine and this is printed either in the A. M. or P. M. column, depending upon the shifting by the workman of hand-wheel 8. This printing of the initial time has been made upon one or the other of the two columns on the left half of record sheet 18. This sheet (as in Fig. 42) shows that there have been a number of such "in" times printed upon the record strip. This "in" operation has also set the "in" time devices of the workman operating the machine to represent the time of the first "in" operation.

When the workman has finished his day's work or his job, as the case may be, he moves dial 4 through handle 7 as before, bringing his number to the top, and moves the handle 8 of the A. M. and P. M. wheel to the proper position, if not already there. The revolution of the dial brings the workman's time devices again into the position shown in Fig. 11. The workman then unlocks and pulls down lever 12 to its lowest or "out" position. As before, this moves the time frame 218 and 174 (Fig. 11) and the two (hour and tenths) time frames 173 and 37 along rods 219 and 175 and onto rods 36 and 35, until they occupy the position shown in full lines at the left of Fig. 11, which is the "out" position. In this position, projections 216, 216 from sleeve 218 overlapping rod 219 lock the parts in position and prevent further rotation of the dial.

In the "out" position of the hour and tenths time devices 173 and 37, they are in register or operative connection with devices for moving the type wheels in the reverse direction to which such wheels are moved to indicate time-of-day, as has been already described, and the time devices, when set as already described, are adapted to control the extent of movement of such reverse-movement devices in accordance with their set condition and thus affect or control the reverse or subtracting movement of the type wheels, in accordance with such setting, or in other words, in accordance with the time of the first or initial operation of the machine by the same workman. In other words, the time devices thus set control the type wheels so as to cause them to indicate the elapsed time between the first and second operations of the machine by the workman. These subtracting devices are, as shown, preferably out of the normal path of revolution of the time devices when on the dial, but they and the time devices are brought into register or operative connection in the out operation. Of course, this may be done by any suitable means, it not being essential to my invention, at least in many of its features, that the particular means shown in the drawings for this purpose be employed. The control by the time devices over the subtracting devices is, in the particular machine shown in the drawings, not exercised until handle 2 has been again depressed by the workman.

When the workman pulls down handle 2, it rocks main cam shaft 10 as before, causes the differentials to be rotated one way by the time-of-day actuating mechanism, controlled by the time cams, just as in the first operation. It also releases the subtracting devices and these in their subtracting operation are now, in the second operation of the machine, controlled by the time devices, set on the previous operation of the machine, and now in operative position to effect such control. The mechanism shown for this purpose I will now describe.

*The subtracting mechanism and connecting parts.*—These are specially illustrated in Figs. 4, 4ª, 8, 9, 10, 15, 16, 38, 39 and 41. The particular subtracting mechanism shown in the drawings consists of two falling racks one for the hours and the other for the tenths of hours. Each rack is composed of two parts a rack proper and an upper member. The tenths of hours rack is composed of the rack proper 70 (Fig. 4) and upper member 57 and the hour rack is composed of rack proper 183 (Fig. 38) and upper member 176. In each case the upper member and its corresponding rack proper constitute the complete subtracting rack. Member 57 has a slot 435, through which projects stud 58 secured to a bracket 59 projecting from side frame 21 (Fig. 8). Member 57 has also a slot 383, through which projects shaft 60. These slots, together with stud 58 and shaft 60, serve to guide member 57 in its vertical movement. The lower part 56 of rack 57 has a knob or head 71 projecting into a squared opening 436 in rack 70. Rack 70 is similarly provided with two vertical slots 382, 224, through which project shafts 66 and 77 respectively for guiding the rack in its vertical movement. Rack 183 has similar vertical slots, through which also project shafts 66 and 77 respectively. The upper one of these slots 385 is shown in Fig. 38, the lower part of rack 183 not being shown, but being similar in all respects to that of rack 70. Both racks 70 and 183 are provided with a series of teeth 136 adapted to engage the gear wheel 98 of the corresponding hours and the tenths of hour differentials 179 and 98 respectively. These racks are normally held in their uppermost position, that shown in Fig. 4, but are permitted to fall by their own weight whenever handle 2 is operated. They are held in their normal position by means of a cam 144 on cam shaft 10 (Fig. 4ª) engaging a roller 146 on the end of arm 147 pivoted on shaft 107. 105 is a link pivoted at one end at 106 to arm 147 and at its other end pivoted at 104 to a bell crank lever 114 pivoted on shaft 112. 103 is a short shaft connecting bell crank 114 with a similar bell crank 194 (Fig. 9) loosely journaled on shaft 112. In the normal position of the parts, with the machine unoperated, shaft 103 runs immediately beneath and supports bell cranks 100 and 177 carrying the two differentials. A spring 101 and 178, each secured at one end to shaft 102, and at the other end to its respective bell crank 100 or 177, holds these in engagement with shaft 103, keeping the differentials at their normal or zero position. In this position, with the time-of-day racks stationary, the subtracting racks 70 and 57 and 183 and 176 will, of course, be held in their up position. On the operation of handle 2, cam 144, after it has turned part way, permits roller 146 and arm 147 to move to the left, thus freeing bell cranks 114 and 194. This permits the subtracting racks to fall, rotating their respective differentials and swinging their supporting bell cranks 100 and 177 downward and to the left, as viewed in Fig. 4ª, this movement being assisted by springs 101 and 178. If no time-pin projects into the path of members 57 or 176, they will fall the length of their slots. This length is proportioned so that the downward movement will rotate the corresponding differential just one-half a revolution and the differentials are arranged so as to have double the number of teeth required for a single revolution of the printing wheels. The time-of-day racks 81 and 182 are so proportioned that in their full upward movement they will similarly rotate the corresponding differential one-half a revolution. Accordingly, in the first or initial operation of the machine, the downward movement of the subtracting racks will have no effect on the time indications of the differentials and their type wheels, as such downward movement will simply rotate a differential and its type wheel to the opposite position on the wheel representing the same time or having the same type. The indication of the differential and its type wheel on the first or initial operation of the machine will depend wholly upon the upward movement of the time-of-day racks 81 and 182 and as these are dependent solely upon the position of the timing cams, the indications of the differentials and their type wheels on the first operation of the machine will simply be that of the time-of-day of such operation. On the second operation of the machine, however, one of the tenths of hours time pins 38, the one that was set on the first operation, and one of the hour time pins 229, the one set on the first operation, will project into the path of the corresponding rack, as shown in Fig. 38, and that rack in falling, will have its downward movement limited or controlled by the position of such pin, as clearly illustrated in Fig. 38. Accordingly, the indicating or recording mechanism will be moved in its reverse or subtracting movement a distance corresponding with the time records or indications set upon the time devices upon the first or initial operation of the machine. It will, of course, be understood that the upward movement of time-of-day racks 81 and 182 rotates the differentials one way to indicate time-of-day or to add time-of-day upon them and the downward movement of the subtracting racks rotates the differentials the reverse way and thus subtracts the first or "in" time of operation of the machine from the time-of-day of the second operation of the machine, giving a resultant condition of the differentials indicating the elapsed time between the two operations and in the following printing operation this time is printed by the type wheels upon the record sheet.

Any suitable devices may be employed for the purpose of borrowing from the hour wheel whenever it becomes necessary. That particularly shown I will now describe. It will, of course, be necessary to borrow one from the hour wheel whenever the tenths of hour differential goes below its zero position, the one indicated in Fig. 4ª. For this purpose I provide two projections or shelves on member 176, 388 and 387, lower and inner shelf 388 adapted in the normal condition to engage the time pins and the outer and higher projection or shelf 387 adapted to engage the pins when borrowing is required. Projection or shelf 387 is one pin distance higher than 388. Fig. 39 shows a pin engaging shelf 388 in the ordinary subtraction and Fig. 38 shows a pin engaging the higher shelf 387. It will be understood, of course, that the tenths member 57 has but one projection or shelf 388. In order to permit an engagement of the higher and outer shelf 387 with the pin for borrowing purposes, I arrange so that member 176 may swing outward at its upward end to the left a slight distance upon shaft 60 as a center, until it strikes bracket 59, which acts as a back stop. This is the position of the parts shown in Fig. 38. In this position, member 176 has fallen one more point than it would ordinarily fall under the control of the particular projecting time pin. It has therefore turned its differential in the subtracting direction one tooth farther than it otherwise would have done, or in other words, it has borrowed one from the hour differential and the hour type wheel. Member 176 is normally held in its forward position by a rock arm 61 loosely pivoted on shaft 60 and carrying stud 389, which projects into slot 437 of member 176 (Figs. 38 and 41.) The position of bell crank 61 therefore determines the forward or backward or borrowing position of member 176. Spring 63, secured to bell crank 61 and to the framework at 74, tends to tilt the upper end of member 176 to its backward or borrowing position. Normally in the regular operation of the machine this tendency is counteracted by a dependent piece 73 integral with bell crank lever 61 and having a cut-out or latched portion at its lower end normally engaging the toe of a bell crank lever 75 loose on shaft 76. Spring 79, secured to the upper arm of lever 75 and to the framework at 80, normally holds the toe of bell crank lever 75 in engagement with the latch of dependent piece 73. This prevents the tilting of lever 61, except when the tenths of hour differential goes below the zero point. When this differential 97 is at the zero point, its shaft or stud 95 is in engagement with a cam surface 438 on the dependent arm 99 of bell crank lever 75. A downward movement of the differential, which carries it below the zero point, will rock 99 to the right, as viewed in Fig. 4ª, releasing dependent piece 73 from the toe of 75; thereupon bell crank lever 61 will rotate to the left on shaft 60, carrying rack 176 to its left or borrowing position, shown in Fig. 38.

Lever 114 has pivoted to it at 113 a link 65, Fig. 4ª, pivoted at 390 (Fig. 4) to a bell crank lever 390ª loose on shaft 60, this lever carrying at its other end a rod 62 (Fig. 41) secured at its other end to an arm 391 also loosely mounted on shaft 60. With the machine unoperated, rod 62 supports bell crank lever 61, holding it in its upper position with the top of member 176 moved to the right or normal subtracting position. When handle 2 is turned, rod 62 is moved downward, permitting bell crank lever 61 to perform its borrowing operation when that becomes necessary. At the conclusion of the operation of handle 2, rod 62 returns bell crank lever 61 to its original position, as also dependent piece 73. As spring 79 also returns bell crank lever 75 to its original position, 73 and 75 are locked, preventing the borrowing operation until the differential again falls below the zero line.

The subtracting racks are restored to their upper and normal position at the close of the operation by means of the differentials and the time-of-day racks. Each time-of-day rack is provided with a return spring 439. One of these is shown in Figs. 4 and 4ª. The spring is secured at 440 to the top of the rack and at 441 to the lower part of the casework. The differential frames carrying the differentials are restored to their normal or zero position, if below it, by means of bell crank lever 114 and shaft 103, as already described. Springs 439 at the same time return the time-of-day racks 81 and 182 to their lowest or normal position and restore the differentials to their zero position if above it. The combined effect of these movements is to rotate the differentials so as to raise the subtracting racks 70 and 57 and 183 and 176 to their highest or normal position.

To enable the hour subtracting rack to have sufficient flexibility, so that its upper part may be free to tilt for the borrowing operation, and yet have its lower part that engages the differential have a perfectly straight up and down movement, I preferably make this subtracting rack of two parts, as shown, with a flexible joint or connection between them. The joint, as shown, consists of the knob 386 of rack 176 fitting into the squared opening 436 in the rack 183, giving substantially a universal joint movement. Such a construction is not needed in the tenths of hours rack, but I have shown the same construction there merely for the sake of uniformity.

The operation of handle 2 on the second or "out" operation also operates the printing devices, as in the first operation, but in this instance the type wheels print the elapsed time between the first and second operation of the machine upon the record sheet and this, as already described, is printed in either the A. M. or P. M. column on the right-hand of the record sheet, as viewed in Fig. 42.

At the close of the operation of handle 2, the parts are returned to their normal positions, as already described. In this return of the parts, pin 49 on bell crank lever 51, being now in register with hook 53 fast on short shaft 47, as it is when the time devices are in their "out" position, as already described and as shown in Fig. 11, strikes hook 53 and rocks shafts 47 and 46, throwing the universal bars 42 to the right, as viewed in Fig. 4, and restoring the set time pins to their original position. The workman then moves the "in" and "out" lever from its "out" position to its uppermost unlocked position. This shifts the time devices to their normal position immediately back of the dial and unlocks the latter. It also shifts the record drum 17 back to its normal or "in" position at the left, as shown in Fig. 3. It will be understood, of course, that when universal bar 42 is restored to its original right-hand position, as shown in Figs. 4 and 40, the "in" signal will have been moved to the left, as shown in Fig. 40, and out of range of window 6, leaving the signal reading "Out." The machine is again ready for the next operation by any workman.

In order to provide against mistakes being made by an operator attempting to "ring out" without first having "rung in," I preferably provide means for indicating in the printed record upon the record sheet in each case an indication of whether the record is one of elapsed time or not. Any suitable means may be used for this purpose. Those shown in the drawings consist of the printing upon the record of a symbol, as shown a star, whenever the record is an elapsed time record. On the record sheet, this star is printed between the hours and the tenths of hours. An inspection of the right-hand side of the sheet 18 will show that all of the records in the two columns on that half of the sheet, except the second one, 396, have such a star, indicating that they are elapsed time records. In the case of the record 396 under the total P. M. column of operator No. 2, no such star appears. This indicates that this record is not an elapsed time record, but that by mistake the operator rung out, although he had made no previous "in" record. The means for accomplishing this are especially illustrated in Figs. 12, 13 and 15. They consist of a separate lever 222 connected with the printing frame and containing a slot 442, through which shaft 131 projects and a slot 443, through which projects short shaft 122, and which lever has a type 226 of a star. Pivoted loosely to this lever at 225 is a bell crank lever 223 loosely pivoted on shaft 115. The right-hand projecting end of 223 lies in the downward path of a pin 78 near the bottom of the tenths subtracting rack 70. Pin 78 and the nose of 223 are so positioned that when the rack has dropped nine points, pin 78 will just touch, but without operating the projecting nose of 223. Should the rack fall one point farther, as it can if there is no time pin in its path to arrest its movement, it will slightly rock 223 and shift lever 222 and type 226 slightly to the left, the type 226 then being just off the printing line, as shown in Fig. 13. On the actuation of the printing frame, the star will not be printed upon the record sheet. If, however, the workman had previously "rung in," it would be impossible for pin 78 to fall far enough to operate bell crank 223, as the subtracting rack 70 would be arrested at some previous point in its fall by a time pin set up on the first operation. Spring 220, fastened at one end to shaft 131 and at the other end at 221 to lever 222, holds the star 226 normally over the ink ribbon 134 on the printing line. Accordingly, whenever time-of-day alone is printed, but not elapsed time on the "out" operation of the machine, no star would be printed and a glance at the record sheet will reveal the fact.

In Fig. 16 I have shown a modified construction of the differential wheels and their connecting time-of-day racks in order to permit of a wider spacing between the hour series time pins and the tenths of hours series. In this construction, the differential 254, 256 is provided with two gears 255 and 264, 255 meshing with teeth 259 of subtraction rack 253, the lower slot of which 263 is shown with shaft 77 passing through it; the other gear 264 meshing with the teeth 258 of an extension 257 from the time-of-day rack 260, the slots of which are represented as 262 and 261, through the latter of which passes shaft 94. This construction permits of a wider spacing between the subtraction racks and their corresponding and respective series of time pins.

Should a workman attempt to operate the machine when the painted arrow at the top of the front casing of the machine is not in line with the arrow of any number on the face of the dial, knob 214 (Fig. 11) of the shifting means of the "in" and "out" lever will not be in engagement with the dependent lugs 217, 217 of any time frame, and such frame will not be shifted either to its setting or its subtracting position and, accordingly, no initial record can be set up upon it nor can any record be made of elapsed time. Under these circumstances, should handle 2 be depressed, any printing that is done will be out of position on the record sheet and will give an indication at a glance that the machine was not correctly operated.

By means of my improvement, a concise record sheet may be made of the "in" times and the elapsed times of any suitable number of operators; no cards or removable time devices are required, (although they may be used in some embodiments of my invention, if desired) the records or indications of the "in" or initial operation of each operator being made and preserved in the machine until the second operation of the machine by the particular workman, at which time the "in" or initial record becomes operative to control the extent of operation of elapsed time indicating mechanism to indicate the elapsed time between the first and second operation of the machine by the workman; and an indication is given upon the record sheet of any mistake or irregularity in the regular operation of the machine, elapsed time records being distinguishable at a glance from those which are not elapsed time records. The mechanism of elapsed time machines is also in many ways simplified and improved, and at the same time visual indications are given of the condition of work of each operator, whether the operator is in or engaged at work or at a job or is out or has completed the job.

The particular mechanism shown in the drawings is only the preferred embodiment of my invention, which is not limited to the particular details therein shown.

What I claim as new and desire to secure by Letters Patent is:

1. In an elapsed time indicating machine the combination of elapsed time indicating mechanism, a device integral with the machine, adapted to be set in accordance with the time of an operation of the machine and, when thus set, to affect the extent of movement of the elapsed time indicating mechanism in a subsequent operation of the machine, a clock movement and means, controlled by the clock movement, for setting the said device in accordance with the time of an operation of the machine.

2. In a time indicating machine a device integral with the machine, adapted to be set to indicate the time of an operation of the machine, and to remain set until some subsequent operation, and adapted at such subsequent operation to affect the extent of movement of the time indicating mechanism.

3. In an elapsed time indicating machine a series of devices integral with the machine and each adapted to be set to indicate the time of an operation of the machine and to remain set until some subsequent operation, and adapted at such subsequent operation to affect the extent of movement of the elapsed time indicating mechanism.

4. In an elapsed time indicating machine the combination of elapsed time indicating mechanism, a series of devices integral with the machine, each adapted to be set in accordance with the time of an operation of the machine and, when set, to affect the extent of movement of the elapsed time indicating mechanism, and clock-controlled means for setting any of the said devices in accordance with the time of an operation of the machine.

5. In an elapsed time indicating machine the combination of elapsed time indicating mechanism, a series of time devices, each adapted to be moved into operative position to be set and, when thus set, adapted to affect the extent of movement of the elapsed time indicating mechanism, a clock movement and means controlled thereby for setting any of said devices, when moved into operative position, in accordance with the time of an operation of the machine.

6. In an elapsed time indicating machine the combination of elapsed time indicating mechanism, a series of time devices each adapted to be moved into operative position to be set, a clock movement, means controlled thereby for setting any of such devices, when moved into operative position to be set, in accordance with the time of operation of the machine, and means for moving such time device at a later time into actuating position to affect the extent of operation of the elapsed time indicating mechanism.

7. In an elapsed time indicating machine the combination of elapsed time indicating mechanism, a time device integral with the machine, movable to operative position to be set and adapted, when set, to affect the extent of operation of the elapsed time indicating mechanism, and clock-controlled means for setting the said device in accordance with the time of an operation of the machine.

8. The combination of elapsed time indicating mechanism, a plurality of individual time devices one for each workman, a clock movement, means controlled by the clock movement for setting an individual time device in accordance with the time of an operation of the machine by the corresponding workman, means for holding the said time device in its set position until a subsequent operation of the machine by the said workman, and connections actuated by the said time device upon a subsequent operation by the said workman for controlling the extent of movement of the elapsed time indicating mechanism in one direction in accordance with the time represented by the said set condition of the time device.

9. In an elapsed time indicating machine the combination of elapsed time indicating mechanism, a series of devices integral with the machine, each device adapted to be set to indicate the time of an operation of the machine and adapted, when thus set, to affect the extent of movement of the elapsed time indicating mechanism, and means for moving each device either into position to be set or into position to affect the movement of the indicating mechanism.

10. The combination of elapsed time indicating mechanism, a series of time devices, a setting device, means for moving any of the time devices so as to register with the setting device, means for causing the setting device to set a time device registering with it to indicate the time of operation, means for locking such time device in its set position, a device, controlled by a time device when set, for moving the elapsed time indicating mechanism one way in accordance with the setting of the time device, clock-controlled means for moving the elapsed time indicating mechanism the reverse way to indicate the time of a later operation, whereby elapsed time between two operations will be indicated upon the indicating mechanism.

11. The combination of an elapsed time type wheel, a series of time devices, a setting device, means for moving any of the time devices into operative position to register with the setting device, means for causing the setting device to set any time device registering with it to indicate the time of such operation, locking means for locking the time device in its set position, a device, controlled by any time device registering with it, for moving the elapsed time type wheel one way in accordance with the setting of the said time device, and clock-controlled means for moving the type wheel the reverse way in accordance with the time of a later operation, whereby the elapsed time between two operations will be recorded.

12. The combination of elapsed time type wheels of different denominations of time, a time cam for each controlled by a clock movement and always positioned in accordance with the time of its denomination, means controlled by the time cams for moving the type wheels one way to indicate the time of such movement, a dial, a plurality of series of time devices, one series for each type wheel, arranged on the dial, means for moving a time device of each series into operative position, means for shifting said time devices when in operative position to cause them to register with setting devices, setting devices, one for each type wheel, controlled by said time cams, for setting the time devices in accordance with the positions of such cams, locking means to hold the time devices in their set position, means for later shifting the time devices to their operative position, and a device, controlled by said time devices when thus shifted into operative position to register with the device, for moving the elapsed time type wheels the reverse way, whereby the resultant position of the type wheels will indicate the elapsed time between two operations of the machine.

13. The combination of elapsed time type wheels of different denominations of time, a time cam for each controlled by a clock movement and always positioned in accordance with the time of its denomination, means controlled by the time cams for moving the type wheels one way to indicate the time of such movement, a dial, a plurality of series of time devices, one series for each type wheel, arranged on the dial, each time device composed of a number of separate movable pieces representing different units of time of its denomination, means for moving a time device of each series into operative position, means for shifting said devices when in operative position to cause them to register with setting devices, setting devices, one for each type wheel, controlled by said time cams, for setting those of the movable pieces of the time devices registering with them, in accordance with the position of the corresponding time cams, locking means to hold the said time devices in their set positions, means for later shifting said devices to their operative position, and devices, one for each type wheel, controlled by the said time devices when thus shifted into registering position, for moving the elapsed time type wheels the reverse way an extent corresponding to the setting of the particular time devices in register with the setting devices, whereby a record will be made of the elapsed time between two operations of the machine.

14. In an elapsed time indicating machine the combination of elapsed time indicating mechanism, means for moving it one way in accordance with the time of such operation, a series of time devices, a common support therefor, a setting device, means for moving such support to bring any time device into registering position with the setting device, means for causing the setting device to set such time device in accordance with the time of such setting operation, subtracting means adapted to subtract from the indicating mechanism, and means for moving such set time device into register with and so as to control the movement of, the said subtracting means, whereby the resultant position of the elapsed time indicating mechanism will indicate the elapsed time between two operations of the machine.

15. In a time indicating machine the combination of time indicating mechanism, a series of time devices, a common support therefor, a setting device, means for bringing any time device into registering position with the setting device, means for causing the setting device to set such time device in accordance with the time of such setting operation, and means for causing a time device, when thus set, to affect the extent of movement of the time indicating mechanism.

16. In an elapsed time indicating machine the combination of elapsed time indicating mechanism, a rotatable dial, and a series of devices carried thereon, each adapted to be set in accordance with the time of an operation of the machine and, when set, adapted to affect the extent of movement of the elapsed time indicating mechanism in accordance with such setting.

17. In an elapsed time indicating machine the combination of elapsed time indicating mechanism, a movable support, and a series of devices carried thereon, each adapted to be set in accordance with the time of an operation of the machine, and, when set, adapted in a subsequent operation of the machine to affect the movement of the elapsed time indicating mechanism in accordance with such setting.

18. In an elapsed time indicating machine a movable support, a setting device, a series of devices carried by the movable support and movable to register with the setting device, each of such devices adapted to be set to represent any time, and means for causing the setting device to set any of such devices, moved into register with it, in accordance with the time of such operation.

19. In an elapsed time indicating machine the combination of an elapsed time type wheel, means for moving it in accordance with the time of such movement, a setting device, a series of time devices adapted to be successively movable into register with the setting device, means for causing the setting device to set any time device registering with it in accordance with the time of such operation, means for moving the elapsed time type wheel the reverse way in accordance with the setting of any time device registering with such means, and means for causing any time device to register with the means for moving the type wheel the reverse way.

20. In an elapsed time indicating machine the combination of an elapsed time type wheel, means for moving it in accordance with the time of such movement, a setting device, a movable support, a series of time devices mounted thereon adapted to be successively movable into register with the setting device, means for causing the setting device to set any time device registering with it in accordance with the time of such operation, means for moving the elapsed time type wheel the reverse way in accordance with the setting of any time device registering with such means, and means for causing any time device to register with the latter means for moving the type wheel.

21. In an elapsed time indicating machine the combination of elapsed time indicating mechanism, a clock movement, means controlled thereby for operating it one way, a time device integral with the machine, clock-controlled means for setting it to represent the time of an operation of the machine, and means controlled by the time device, when set, to move the elapsed time indicating mechanism the reverse way to cause it to indicate the elapsed time between the two operations.

22. In an elapsed time indicating machine the combination of elapsed time indicating mechanism, a clock movement, means controlled thereby for operating it one way, a time device integral with the machine, means controlled by the clock movement for setting it to represent the time of an operation of the machine, means for moving the time device to cause it to register with the setting device to have the time of such operation set upon it, and means for moving the elapsed time indicating mechanism the reverse way controlled by the time device when set.

23. In an elapsed time indicating machine the combination of elapsed time indicating mechanism, a clock movement, means controlled thereby for operating it one way, means for moving it the reverse way, a time device integral with the machine, means controlled by the clock movement for setting it to represent the time of an operation of the machine, and means for moving the time device to cause it to register with the said reverse movement means to control the extent of movement of the latter, whereby the indication of the elapsed time between two operations will be given.

24. In an elapsed time indicating machine the combination of elapsed time indicating mechanism, a clock movement, means controlled thereby for operating it one way, means for moving it the reverse way, a time device integral with the machine, means controlled by the clock movement for setting it to represent the time of an operation of the machine, means for moving the time device to cause it to register with the setting device and to cause it to register with the reverse movement means to control the extent of movement of the latter, whereby an indication of the elapsed time between two operations will be given.

25. In an elapsed time indicating machine the combination of elapsed time indicating mechanism, a clock movement, means controlled thereby for operating it one way, a series of time devices, means controlled by the clock movement for setting any time device to represent the time of such setting operation, and means controlled by any time device when set to move the elapsed time indicating mechanism the reverse way from that in which it is moved by the clock-controlled means to cause it to indicate the elapsed time between two operations of the machine.

26. In an elapsed time indicating machine the combination of elapsed time indicating mechanism, a clock movement, means controlled thereby for operating it one way, a series of time devices, means controlled by the clock movement for setting any such device to represent the time of such operation, means for moving the time devices to cause any one of them to register with the setting device, and means for moving the elapsed time indicating mechanism the reverse way controlled by a time device when set.

27. In an elapsed time indicating machine the combination of elapsed time indicating mechanism, a clock movement, means controlled thereby for operating it one way, means for moving it the reverse way, a series of time devices, means controlled by the clock movement for setting any of the said devices to represent the time of such setting operation, and means for moving the time devices to cause any one of them to register with the reverse movement means to control the extent of movement of the latter and to cause an elapsed time indication between the two operations to be given by the indicating mechanism.

28. In an elapsed time indicating machine the combination of elapsed time indicating mechanism, a clock movement, means controlled thereby for operating it one way, means for moving it the reverse way, a series of time devices, means controlled by the clock movement for setting any of such devices to represent the time of such setting operation, means for moving the time devices to cause any one of them to register with the setting device and to register with the reverse movement means to control the extent of movement of the latter and to cause an indication of the elapsed time between the two operations to be given by the indicating mechanism.

29. The combination of elapsed time indicating mechanism, a clock movement, means controlled thereby for operating it one way, a series of time devices, a movable support under the control of the operator for carrying and moving the time devices, a setting device controlled by the clock movement normally out of the path of movement of the time devices, means for moving the indicating mechanism the reverse way also normally out of the path of movement of the time devices, and means for shifting each time device, when moved to proper position by the support, to cause it to register with the setting device to be set thereby to correspond with the time of such setting, and to cause it to register with the reverse movement means to control their movement and thereby the extent of movement of the indicating mechanism in the reverse way, whereby a plurality of time devices representing different operators may be set to indicate the time of operation by a plurality of operators and then upon a later operation of the machine by any one of such operators his time device may be moved into position to control the indicating mechanism in its reverse operation and thus give an indication of the elapsed time between the two operations of the machine by such operator.

30. The combination of elapsed time indicating mechanism, a clock movement, means controlled thereby for operating it one way, a series of time devices, a rotatable dial under control of the operator for carrying and moving the said devices, a setting device controlled by the clock movement normally out of the path of movement of the time devices, means for moving the indicating mechanism the reverse way also normally out of the path of movement of the time devices, means for shifting each time device, when moved to proper position by the dial, to cause it to register with the setting device to be set thereby to correspond with the time of such setting, and to cause it to register at a later time with the reverse movement means to control their movement and that of the indicating mechanism the reverse way, a movable record drum, provided with spaces, one corresponding with each time device, means for moving both dial and drum correspondingly, and printing means, whereby whenever any time device, previously set, is brought into its controlling or actuating position, the corresponding record space upon the drum will be upon the printing line and the elapsed time between the two operations of the machine by the corresponding operator will be printed upon the record space assigned to such operator.

31. In an elapsed time indicating machine the combination of a series of movable devices each adapted to be set to represent the time of an operation of the machine, a clock-controlled setting device for setting any such device in register with it, the setting device being normally out of the path of movement of the time devices, and means for moving each time device into such operative connection.

32. In an elapsed time indicating machine the combination of a series of movable time devices each adapted to be set to represent the time of an operation of the machine, elapsed time indicating mechanism, clock-controlled means for moving it one way, a device for moving it the reverse way, normally out of the path of the time devices, and means for moving any time device into operative connection with such reverse movement device to control the movement of the latter and that of the reverse movement of the elapsed time indicating mechanism.

33. In an elapsed time recording machine the combination of elapsed time recording mechanism, a series of time devices each adapted to be set to represent the time of such setting, a movable support therefor, a movable support adapted to carry a record sheet provided with record spaces one for each time device, and common means for synchronously and correspondingly moving both supports, so that whenever any time device is moved into operative position to control the elapsed time recording mechanism, the corresponding space on the record sheet will be upon the printing line.

34. The combination of a time type wheel, normally at zero, time-controlled means for moving it one way in accordance with the time of such operation, a rotatable dial, a series of time devices mounted thereon, a time-controlled device for setting any time device in register with it in accordance with the time of such setting normally out of the path of revolution of the time devices, a device for moving the type wheel the reverse way to that of its movement by its time controlled moving means also normally out of the path of revolution of the time devices but adapted to be controlled in its movement of the type wheel by any time device registering with it which has previously been set, means for shifting any time device when in proper position so as to register either with the setting device or the device for moving the type wheel the reverse way, whereby the resultant of the two movements of the type wheel will bring upon the printing line type representing the elapsed time between two operations of the machine, a rotatable drum adapted to carry a record sheet provided with spaces one for each time device, means for moving both dial and drum synchronously and correspondingly, and printing devices.

35. In the operating mechanism of an elapsed time indicating machine the combination of a series of time devices, setting means for setting the time devices in accordance with the time of such setting, each such record adapted in a later operation of the machine by the same operator to affect the extent of movement of the indicating mechanism, and a locking device for preserving such time devices thus set until such later operation by the same operator.

36. In an elapsed time indicating machine a series of devices, each device adapted to be set to represent the time of an "in" or first operation of the machine, means for thus setting them, a series of indicators, one for each time device, each indicator adapted to indicate the first or "in" operation or a later or "out" operation, and connections between the setting means and the indicator adapted to be operated during the "in" or first operation to cause the indicator to give its "in" or first indication, and during the "out" or second operation of the machine to give its "out" or second indication.

37. In an elapsed time indicating machine a series of devices, each device adapted to be set to represent the time of an "in" or first operation of the machine, means for thus setting them, a series of indicators, one for each time device, each indicator adapted to indicate the first or "in" operation or a later or "out" operation, and connections between the setting means and the indicator adapted to be operated during the "in" or first operation to cause the indicator to give its "in" or first position, and during the "out" or second operation of the machine to cause it to give its "out" or second position, and a rotatable dial carrying the time devices and the indicators.

38. In an elapsed time indicating machine the combination of a movable support, a series of time devices supported and carried thereon, a series of indicators, one for each time device, also carried on said support, a clock-controlled setting device adapted, when in register with a time device, to set it in accordance with the time of such operation, and means actuated by the setting device during the setting operation to cause the corresponding indicator to give an indication that its time device is in set position.

39. In an elapsed time indicating machine the combination of a movable support, a series of time devices supported and carried thereon, a series of indicators, one for each time device, also carried on said support, a clock-controlled setting device adapted, when in register with a time device, to set it in accordance with the time of such operation, means actuated by the setting device during the setting operation to cause the corresponding indicator to give its first or "in" indication means for moving the indicating mechanism one way controlled by any time device in register therewith, and means for moving such time device and its indicator to their normal position after such operation.

40. In an elapsed time indicating machine a series of devices, each device adapted to be set to represent the time of an "in" or first operation of the machine, means for thus setting them, a series of indicators, one for each time device, each indicator adapted to indicate the first or "in" operation or a later or "out" operation, and means adapted to be operated during the "in" or first operation to move its indicator to its "in" or first position.

41. In an elapsed time indicating machine the combination of a series of devices, each device adapted to be set to represent the time of an "in" or first operation of the machine, a series of indicators, one for each time device, a movable support for carrying the time devices and the indicators, a setting device normally out of the path of movement of the time devices adapted to set any time device registering with it in accordance with the time of such operation, a shifting device for shifting a time device, when brought into proper position by the support, into register with the setting device, means adapted to be operated during the setting operation to cause the corresponding indicator to give its "in" or first indication, and means adapted to be actuated at a second or "out" operation of a time device, previously set, for giving to such device and its indicator their original indication.

42. In a time indicating machine the combination of a plurality of separate devices for affecting the extent of movement of time indicating mechanism, a plurality of indicators, one for each of said devices, and connections between each device and its indicator adapted to set the indicator to represent the condition of its corresponding device.

43. In an elapsed time indicating machine the combination of elapsed time indicating mechanism, time controlled means for operating it one way, means for operating it the reverse way, a movable support, a series of time devices carried thereon, a time controlled setting device adapted to set any of said time devices when in register therewith in accordance with the time of such operation, and a device normally out of operative alinement with the time devices but adapted to engage one of them, after the latter has been moved by its support into proper position, to move it into register either with the setting device or the reverse movement means and to lock the support in such position, whereby a time device may be moved into register with the setting device at one operation of the machine and may at a later operation be moved into register with the reverse movement means to control the extent of movement of the latter whereby an indication of the elapsed time between said two operations may be given by the indicating mechanism.

44. In an elapsed time indicating machine the combination of elapsed time indicating mechanism, time controlled means for operating it one way, means for operating it the reverse way, a movable support, a series of time devices carried thereon, a time controlled setting device adapted to set any of said time devices when in register therewith in accordance with the time of such operation, a device normally out of operative alinement with the time devices but adapted to engage one of them, after the latter has been moved by its support into proper position, to move it into register either with the setting device or the reverse movement means and to lock the support in such position, whereby a time device may be moved into register with the setting device at one operation of the machine and may at a later operation be moved into register with the reverse movement means to control the extent of movement of the latter whereby an indication of the elapsed time between said two operations may be given by the indicating mechanism, a movable record support adapted to carry a record sheet provided with a space corresponding to each time device, and connections between such support and the in and out device for shifting the former to its in or out position.

45. In the operating mechanism of an elapsed time indicating machine the combination with elapsed time indicating mechanism, a movable time device, a setting device adapted to set the time device in accordance with the time of such setting, and means for moving the indicating mechanism one way, of an in and out device adapted to occupy any one of three positions, one position out of operative engagement with the time device and the other two positions in operative engagement therewith and adapted, when in engagement with the time device, to move it into register with the setting device, or into engagement with means for moving the elapsed time indicating mechanism.

46. In an elapsed time indicating machine the combination of a rotatable dial, a series of time devices carried thereon adapted to be set to indicate time, a rotatable drum adapted to carry a record sheet provided with spaces, one for each time device, a shaft upon which the dial and drum are mounted, the shaft, dial and drum being so connected that all three shall rotate together as a unit but permitting axial movement of the dial and shaft relative to each other and of the drum and shaft relative to each other, a printing device, means for moving the drum in the direction of its axis to bring different columns opposite the printing device, and means for moving it an additional axial distance to bring different sub-divisions of either column opposite the printing device.

47. In the operating mechanism of an elapsed time indicating machine the combination of a time device forming an integral part of the machine and adapted to be set to indicate the time of a first or initial operation of the machine and provided with a number of movable parts representing different units of time, and time controlled means for selecting and setting such one of said parts as represents the time of such operation.

48. In the operating mechanism of an elapsed time indicating machine, the combination of a series of time devices, each adapted to be set to indicate the time of a first or initial operation of the machine and each composed of a number of movable parts representing different units of time, time controlled means for selecting and setting such one of said parts of any time device in register with such means as represents the time of such operation, and means for bringing any one of said time devices into register with such setting device.

49. In the operating mechanism of an elapsed time indicating machine the combination of a series of time devices, each adapted to be set to indicate the time of a first or initial operation of the machine and each composed of a number of movable parts representing different units of time, time controlled means for selecting and setting such one of said parts of any time device in register with such means as represents the time of such operation, means for bringing any one of said time devices into register with the setting device, a signal for each time device, and a universal member for each time device adapted to be actuated whenever any of its parts is set to move the signal to indicate such operation.

50. In the operating mechanism of an elapsed time indicating machine the combination of a rotatable dial, a series of time devices carried thereon and adapted to be set to indicate the time of a first or initial operation of the machine, a frame carrying each time device, a set of rods, secured to the dial, for each frame and upon which the frame is adapted to slide, an additional set of rods out of the path of revolution of the time devices and their supporting rods but adapted to register successively with the said supporting rods as the dial rotates, a sliding device, normally out of the path of revolution of said frames, but adapted to engage with a frame, when in register with said additional set of rods, and to slide it onto the said latter rods to bring the corresponding time device into register either with a setting device or with means for moving the elapsed time indicating mechanism one way.

51. In the operating mechanism of an elapsed time indicating machine the combination of a rotatable dial, a series of time devices carried thereon and adapted to be set to indicate the time of a first or initial operation of the machine, a frame carrying each time device, a set of rods, secured to the dial, for each frame and upon which the frame is adapted to slide, an additional set of rods out of the path of revolution of the time devices and their supporting rods but adapted to register successively with the said supporting rods as the dial rotates, a sliding device, normally out of the path of revolution of said frames, but adapted to engage with a frame, when in register with said additional set of rods, and to slide it onto the said latter rods to bring the corresponding time device into register either with a setting device or with means for moving the elapsed time indicating mechanism one way, and a lock for locking the supporting rods of a time device and the additional rods whenever the time device is slid upon the latter to prevent further rotation of the dial.

52. In an elapsed time indicating machine the combination of elapsed time indicating mechanism adapted to indicate either elapsed time or time of day, and a device adapted to indicate whether any operation of the machine is an elapsed time operation or a time of day operation.

53. In an elapsed time recording machine the combination of a type wheel adapted to print either a time of day or an elapsed time record, means for causing it on any operation of the machine to print either one or the other of such records, and a printing device adapted to record an indication at the end of the operation of the machine whether it is an elapsed time record or not.

54. In an elapsed time recording machine the combination of a type wheel adapted to print either a time of day or an elapsed time record, means for causing it on any operation of the machine to print either one or the other of such records, a printing device adapted to print a symbol representing an elapsed time operation of the machine, and means for preventing the printing of such indication upon any other operation of the machine.

55. In an elapsed time recording machine the combination of a type wheel adapted to print either a time of day or an elapsed time record, means for causing it on any operation of the machine to print either one or the other of such records, a printing device adapted to print a symbol representing an elapsed time operation of the machine, and means, actuated only on a time of day operation of the machine, to move the printing device out of operative position.

56. In a time indicating machine the combination of a rotatable dial provided with a series of numbers representing different operators, a series of individual operating mechanisms, carried on said dial, one for each operator, the said mechanisms being adapted to be brought by the dial successively into operative position, a record drum adapted to carry a record sheet provided with spaces, one for each operator, connections between the dial and drum adapted to cause both to rotate together to bring upon the printing line the space upon the record sheet corresponding to any operator simultaneously with the bringing into operative position of the operative mechanism corresponding to the said operator, a hand wheel on said dial connected with the drum and adapted to move the drum axially to bring different columns of the record sheet opposite the printing device, and connections between the hand wheel and the dial causing them normally to rotate together but permitting the hand wheel to be operated relatively to the dial.

57. In a time indicating machine the combination of a rotatable dial provided with a series of numbers representing different operators, series of individual operating mechanisms, carried on said dial, one for each operator, the said mechanisms being adapted to be brought by the dial successively into operative position, a record drum adapted to carry a record sheet provided with spaces, one for each operator, means for moving the record drum axially to bring different columns into printing position, connections between the dial and drum adapted to cause both to rotate together to bring into printing position the space on the record drum corresponding to any operator simultaneously with the bringing into operative position of the operating mechanism corresponding to said operator, a hand wheel on said dial connected with the drum and adapted to move the drum axially to bring different sub-divisions of each column of the record sheet into printing position, and connections between the hand wheel and dial causing them normally to rotate together but permitting the hand wheel to be turned relatively to the dial to move the drum axially to bring different sub-divisions of the column into printing position.

58. The combination of a plurality of differentials for indicating elapsed times of different denominations, means for moving each of them one way to indicate time of day, means for moving each of them the reverse way in accordance with the time of a previous operation, and separate connections between each differential and each of its corresponding means, whereby wider spacing may be permitted between such means.

59. In the subtracting mechanism of an elapsed time indicating machine a subtracting rack, adapted to be controlled by devices representing the time of a first or initial operation, the said subtracting rack being composed of a part having a straight path of travel and a flexible part connected therewith adapted normally to have the same line of travel, but free to move a slight distance out of the same for the purpose of borrowing and means for controlling such borrowing movement.

60. The combination of elapsed time indicating mechanism, a clock movement, an individual time device for the individual workman, means, controlled by the clock movement, for setting the time device in accordance with the time of an operation by the said workman, means for holding the time device in its set condition until a subsequent operation by the said workman, and connections adapted to be actuated by the time device upon such subsequent operation by the said workman to control the extent of movement of the elapsed time indicating mechanism in one direction in accordance with the time represented by the said set condition of said time device.

61. A time device adapted to be set to indicate the time of an operation of an elapsed time indicating machine and to remain set until some subsequent operation of such machine, and adapted at such subsequent operation to affect the extent of movement of the time indicating mechanism.

62. The combination with a time device adapted to be set to represent the time of an operation of an elapsed time indicating machine, of elapsed time indicating mechanism of such an elapsed time indicating machine, clock-controlled means for operating such indicating mechanism one way, clock-controlled means for setting the time device to represent the time of an operation of the machine, and means in such machine controlled by the time device as thus set, adapted in a subsequent operation of such machine to move the elapsed time indicating mechanism the reverse way to cause it to indicate the elapsed time between the two operations of the machine.

63. The combination with a time device provided with a number of movable parts representing different units of time, of elapsed time indicating mechanism of an elapsed time indicating machine, and time controlled means in such machine for selecting and setting such movable part or parts of the time device as represent the time of such operation.

In testimony whereof, I have signed my name to this specification, in the presence of two subscribing witnesses.

JAMES W. BRYCE.

Witnesses:
  JAY STONE,
  L. H. S. HEYL.

---

Copies of this patent may be obtained for five cents each, by addressing the "Commissioner of Patents, Washington, D. C."